United States Patent
Akkaraju et al.

(10) Patent No.: US 10,447,702 B2
(45) Date of Patent: Oct. 15, 2019

(54) DIGITAL CREDENTIAL TIERS

(71) Applicant: Screening Room Media, Inc., West Hollywood, CA (US)

(72) Inventors: Prem Akkaraju, Los Angeles, CA (US); Giorgio Vanzini, Los Angeles, CA (US)

(73) Assignee: Screening Room Media, Inc., West Hollywood, CA (US)

( * ) Notice: Subject to any disclaimer, the term of this patent is extended or adjusted under 35 U.S.C. 154(b) by 116 days.

(21) Appl. No.: 15/463,485

(22) Filed: Mar. 20, 2017

(65) Prior Publication Data

US 2018/0270245 A1 Sep. 20, 2018

(51) Int. Cl.
*H04L 29/06* (2006.01)
*G06F 21/10* (2013.01)

(52) U.S. Cl.
CPC ............ *H04L 63/102* (2013.01); *G06F 21/10* (2013.01)

(58) Field of Classification Search
USPC .......................................................... 726/6
See application file for complete search history.

(56) References Cited

U.S. PATENT DOCUMENTS

| | | | | |
|---|---|---|---|---|
| 7,360,160 B2* | 4/2008 | Matz | ...................... | H04L 63/10 715/716 |
| 7,603,439 B2* | 10/2009 | Dilley | ...................... | H04L 29/06 709/203 |
| 7,996,882 B2* | 8/2011 | L'Heureux | ............. | G06F 21/10 726/4 |
| 8,120,637 B2* | 2/2012 | Baird | ...................... | H04H 60/80 348/14.08 |
| 8,762,850 B2* | 6/2014 | Matz | ...................... | H04L 63/10 715/723 |
| 8,850,473 B2* | 9/2014 | Sheehan | ............ | H04N 21/2221 725/35 |
| 9,171,162 B2* | 10/2015 | Malkhasyan | ........... | G06F 21/57 |
| 9,380,028 B2* | 6/2016 | Rizzo | .................. | H04L 63/0272 |
| 9,471,923 B2* | 10/2016 | Cragun | .................. | G06Q 20/42 |
| 2002/0023010 A1* | 2/2002 | Rittmaster | .......... | G06F 16/9537 705/26.1 |
| 2004/0078268 A1* | 4/2004 | Sprogis | .................. | G06Q 30/02 705/14.61 |
| 2006/0155727 A1* | 7/2006 | Kim | ........................ | G06F 21/10 |

(Continued)

*Primary Examiner* — Taghi T Arani
*Assistant Examiner* — Badridot Champakesanatusptodotgov
(74) *Attorney, Agent, or Firm* — Schwegman Lundberg & Woessner, P.A.

(57) ABSTRACT

A method for selecting an alternative digital content item can include assigning a digital content license to access a first digital content item to a user account, the digital content license to access the first digital content item permitting a user of the user account to attend a scheduled presentation of the first digital content item at an exhibitor location; receiving, from a client device associated with the user account, a request to use the digital content license to attend a scheduled presentation of an alternate digital content item; determining that the digital content license to the first digital content item is eligible to secure a digital credential to attend a scheduled presentation of an alternate digital content item; identifying a set of alternate digital content items that can be accessed by the user; and providing, to the client device, data identifying the set of alternate digital content items.

15 Claims, 11 Drawing Sheets

(56) References Cited

U.S. PATENT DOCUMENTS

| | | | |
|---|---|---|---|
| 2006/0168123 A1* | 7/2006 | Krstulich | H04L 63/083 709/219 |
| 2007/0219917 A1* | 9/2007 | Liu | G06F 21/10 705/59 |
| 2009/0144143 A1* | 6/2009 | Iyer | G06Q 30/02 705/14.52 |
| 2009/0199287 A1* | 8/2009 | Vantalon | G06F 21/10 726/9 |
| 2010/0174608 A1* | 7/2010 | Harkness | G06F 21/10 705/14.53 |
| 2011/0041148 A1* | 2/2011 | Piepenbrink | H04N 7/17336 725/28 |
| 2014/0215018 A1* | 7/2014 | Lam | H04L 63/108 709/219 |
| 2015/0205755 A1* | 7/2015 | Gilbert | H04L 9/083 726/9 |
| 2015/0310472 A1* | 10/2015 | Davidson | G06Q 30/0222 705/14.23 |
| 2016/0088319 A1* | 3/2016 | Zucchetta | H04N 21/41415 725/25 |
| 2016/0337369 A1* | 11/2016 | Sanso | H04L 67/1097 |
| 2016/0366118 A1* | 12/2016 | Wang | H04L 63/083 |
| 2017/0078760 A1* | 3/2017 | Christoph | H04N 21/2387 |
| 2017/0105032 A1* | 4/2017 | Davis | H04N 21/2541 |
| 2017/0126720 A1* | 5/2017 | Olinsky | H04L 67/22 |

* cited by examiner

DIGITAL CREDENTIAL TIERS

BACKGROUND

With the advent of digital data and the Internet, digital content can now be shared quickly and easily to users in almost any geographic location. For example, digital content posted publicly to websites can be accessed by any user with a computer and internet connection. Although sharing digital content, particularly digital content that is intended to be accessed with no restrictions, has become much easier, the threat of unauthorized access and/or use of digital content that is intended to be restricted has increased. For example, some digital content can be intended to be accessed and/or used under specified restricted conditions, such as confidential content, sensitive content, licensed content, etc.

Current systems focus their security efforts on restricting initial access to digital content, and provide little to no security once initial access has been granted. For example, many systems will require initial user authentication (e.g., user name, password, device recognition, etc.) prior to providing access to digital content, but do not monitor use of the digital content after initial access is granted. As a result, digital content can easily be misused, copied, shared, etc. Accordingly, improvements are needed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
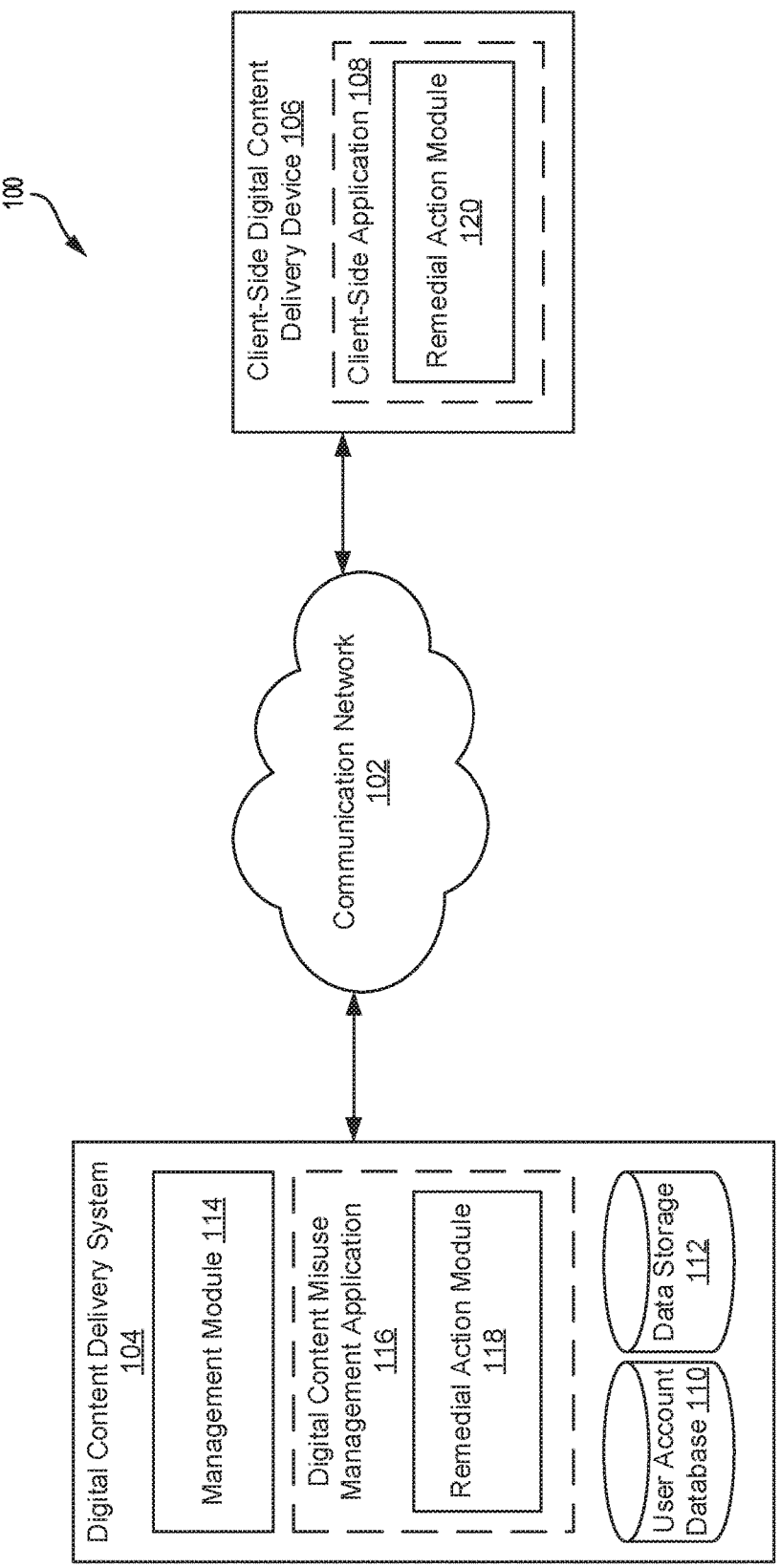
FIG. 1 shows an example digital content distribution network, according to certain example embodiments.

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT-SIDE DIGITAL CONTENT DELIVERY DEVICE" in this context refers to any machine that interfaces to a communication network to obtain resources from one or more server systems or other computing device. A client-side digital content delivery device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATION NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"DIGITAL CONTENT DELIVERY SYSTEM OR DIGITAL CONTENT DISTRIBUTION NETWORK" in this context refers to a system of distributed servers (e.g. networked proxy server) that deliver digital content to a user.

"MACHINE-READABLE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"MODULE" in this context refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner.

In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC).

A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

DESCRIPTION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2015, SCREENING ROOM MEDIA, INC., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Drawings

The current application discloses a number of technologies that may be used, in example embodiments, to address and mitigate challenges with enforcing access and/or usage restrictions on digital content. These technologies monitor use of digital content and suspend or terminate access to digital content when certain behaviors are detected.

FIG. 1 shows an example digital content distribution network, according to certain example embodiments. It shall be appreciated that although the various functional components of network 100 are discussed in a singular sense, multiple instances of one or more of the various functional components may be employed.

Network 100 includes multiple computing devices connected to communication network 102 and configured to communicate with each other through use of communication network 102. A computing device is any type of general computing device capable of network communication with other computing devices. For example, a computing device includes a personal computing device such as a desktop or workstation, a business server, or a portable computing device, such as a laptop, smart phone, or a tablet PC. A computing device can include some or all of the features, components, and peripherals of machine 1000 of FIG. 10.

To facilitate communication with other computing devices, a computing device includes a communication interface configured to receive a communication, such as a request, data, etc., from another computing device in network communication with the computing device and pass the communication along to an appropriate module running on the computing device. The communication interface is configured to send a communication to another computing device in network communication with the computing device.

Network 100 includes digital content delivery system 104 and client-side digital content delivery device 106 configured to provide digital content to users, as well as to enforce access and/or usage restrictions on the digital content. Digital content includes any type of digital content or data, such as text files, video files, music files, etc. Digital content is associated with one or more intended restrictions on access and/or use of the digital content. For example, digital content can include confidential data and/or sensitive data, such as personal information (e.g., social security number), financial information (e.g., bank records, account numbers, etc.), medical records, confidential work materials, etc., that are restricted for use by specified people. Digital content can also include licensed content, such as movie rentals, movie purchases, music rentals, etc., that can be restricted for use by a specified person or audience, during specified times, etc.

Restrictions include any type of restriction regarding accessing and/or using the digital content, such as a specified user or specified set of users that can access and/or use the digital content, a specified time period during which the digital content can be accessed and/or used, a specified geographic location where the digital content can be accessed and/or used, restrictions on how the digital content can be accessed and/or used, restrictions on whether the digital content can be copied and/or shared, etc.

In network 100, digital content delivery system 104 and client-side digital content delivery device 106 work together to provide users with access to digital content, as well as to enforce access and/or usage restrictions on the digital content. For example, digital content delivery system 104 and client-side digital content delivery device 106 monitor one or more usage signals to ensure that digital content is not being misused (e.g., that restrictions associated with the digital content are not being violated). In the event that digital content is being misused, or is potentially being misused, digital content delivery system 104 and/or client-side digital content delivery device 106 execute one or more remedial actions, such as suspend or terminate a user's access to the digital content, gather additional data, investigate use of the digital content, etc.

In network 100, a user interacts with digital content delivery system 104 through client-side digital content delivery device 106 connected to communication network 102 by direct and/or indirect communication. Digital content delivery system 104 is comprised of one or more computing devices configured to work with client-side digital content delivery device 106 to provide users with digital content, as well as to enforce access and/or usage restrictions on the digital content. Digital content delivery system 104 supports connections from a variety of different types of client-side digital content delivery devices 106, such as desktop computers; mobile computers; mobile communications devices (e.g. mobile phones, smart phones, tablets, etc.); smart televisions; set-top boxes; and/or any other network-enabled computing devices. Client-side digital content delivery device 106 can be of varying type, capabilities, operating systems, etc. Furthermore, digital content delivery system 104 can concurrently accept connections from and interact with multiple client-side digital content delivery devices 106.

A user interacts with digital content delivery system 104 via client-side application 108 installed on client-side digital content delivery device 106. In some embodiments, client-side application 108 includes a digital content delivery system-specific component. For example, the component can be a stand-alone application, one or more application plug-ins, and/or a browser extension. Client-side application 108 can present a user interface (UI) for the user to interact with digital content delivery system 104. For example, the UI can provide the user with digital content as well as include one or more user interface elements (e.g., buttons, text fields, etc.) to enable a user to interact with digital content delivery system 104.

Additionally, client-side application 108 presents a user with digital content. Client-side application 108 utilizes one or more output devices (e.g., display, speaker, etc.) of client-side digital content delivery device 106 and/or a secondary computing device (not shown) coupled to client-side digital content delivery device 106 to present digital content received from digital content delivery system 104. For example, in an embodiment in which client-side digital content delivery device 106 is a mobile phone, client-side application 108 causes presentation of digital content using a display and/or speaker of the mobile phone. As another example, in an embodiment in which client-side digital content delivery device 106 is a set-top box, client-side application 108 causes presentation of digital content on a display of a viewing device (e.g., television, monitor, etc.) that is connected to the set-top box.

In some embodiments, client-side application 108 embeds digital content with a digital watermark that can be used if the digital content has been misused. For example, the digital watermark is embedded with an identifier for client-side digital content delivery device 106. Once embedded in the digital content, the digital watermark will be present in any copies made of the digital content, including unauthorized copies. Hence, if an unauthorized copy of digital content is found, the digital watermark embedded in the unauthorized copy can be used to identify the source.

Digital content delivery system 104 is configured to manage digital content for multiple user accounts. For example, digital content delivery system 104 allows users to store, access, rent and/or purchase digital content.

To facilitate the various services provided by digital content delivery system 104, a user creates a user account with digital content delivery system 104. The account information for each created user account is maintained in user account database 110. User account database 110 stores profile information for each user account, including a unique account identifier identifying the user account, personal information, username, password, email address, home address, credit card information, banking information, etc. User account database 110 also includes account management information, such as data storage locations, security settings, personal configuration settings, device identifier for client-side digital content delivery devices 106 that are authorized to access the user account, etc.

A user account can be used to purchase, rent, manage and store digital content, such as digital data, documents, text files, audio files, video files, etc. For example, digital content delivery system 104 provides an online retailer where users can purchase/rent digital content, such as movies, shows, books, music, etc.

Upon digital content being purchased and/or rented by a user, the user's account is updated to indicate that the user has acquired a digital content license to the purchased and/or rented digital content. This allows the user to access the digital content using client-side digital content delivery devices 106. For example, a digital content identifier identifying rented and/or purchased digital content (e.g., movie) can be assigned to a user account in user account database 110 and associated with the corresponding user account. The digital content identifier is used to identify the digital content as well as the location of the digital content.

Further, the user's account is updated with data defining restrictions associated with the digital content, such users authorized to access or use the digital content, geographic locations where the digital content can be accessed, times during which the digital content can be accessed, etc. In some embodiments, the restrictions are based on a digital content license purchased by the user with respect to digital content. For example, a user may have purchased a limited rental of a movie that entitles the user to view the movie a limited number of times, during a limited time and/or with a limited number of other users.

Digital content is stored in data storage 112. Data storage 112 can be a storage device, multiple storage devices, or a server. Alternatively, data storage 112 can be a cloud storage provider or network storage accessible via one or more communication networks. Digital content delivery system 104 can hide the complexity and details regarding storage of digital content from client-side digital content delivery device 106 such that the location of digital content stored by digital content delivery system 104 is not known by client-side digital content delivery device 106. Digital content delivery system 104 stores the digital content in a network accessible storage (SAN) device, in a redundant array of inexpensive disks (RAID), etc. Data storage 112 stores digital content using one or more partition types, such as FAT, FAT32, NTFS, EXT2, EXT3, EXT4, ZFS, ReiserFS, BTRFS, and so forth.

Data storage 112 also stores metadata describing digital content, digital content types, and the relationship of digital content to various user accounts. The metadata can be stored as part of the digital content or can be stored separately. In one variation, digital content stored in data storage 112 is assigned a system-wide unique identifier. In some embodiments, the metadata includes restrictions associated with the digital content.

Digital content delivery system 104 includes management module 114 configured to manage and access each user account and the digital content assigned to the user accounts. Management module 114 is configured to communicate with user account database 110 and data storage 112 to adjust privileges and otherwise manage access to digital content.

Upon a user logging into their user account from client-side digital content delivery device 106, management module 114 accesses the account information associated with the user account to identify digital content assigned to the user account, as well as any corresponding restrictions placed on the digital content. Management module 114 enables a user to access and/or use the digital content assigned to the user's account. For example, management module 114 accesses the user's account to identify digital content identifiers assigned to the user account. Management module 114 uses the digital content identifiers to identify and locate the digital content assigned to the user's account, which can be presented according to the account configuration data.

Management module 114 also updates the user's profile to update the user's usage history. Each user's profile includes a usage history indicating the digital content that the user has accessed and/or used, as well as metadata describing each use. This can include the times at which the user accessed and/or used the digital content, as well as any other usage signal data, such as a number of mobile computing devices present during usage, geographic location of the user when accessing the digital content, client-side digital content delivery device 106 used to access the digital content, etc. Management module 114 accesses a user's account and update the user's usage history as the user accesses and/or uses digital content to record each use.

As explained above, in network 100, digital content delivery system 104 and client-side digital content delivery device 106 monitor one or more usage signals to ensure that digital content is not being misused and, in the event that digital content is potentially being misused, execute one or more remedial actions. Usage signals can be any type of data gathered with regard to presenting digital content. For example, usage signals include the user's usage history, frequency that a user accesses digital content, a number of times the user has accessed a particular item of digital content (e.g., a particular movie, document, etc.), a number of detected users viewing the digital content, location of the user when accessing digital content, configuration changes prior to or while accessing digital content, etc.

Digital content delivery system 104 and client-side data detection device 106 each gather and share usage signal data to determine whether digital content is potentially being misused and, in the event that digital content is potentially being misused, execute one or more remedial actions. For example, digital content delivery system 104 includes digital content misuse management application 116 configured to determine whether digital content is potentially being misused and, in the event that digital content is potentially being misused, execute one or more remedial actions. Likewise, client-side application 108 can be configured to determine whether digital content is potentially being misused and, in the event that digital content is potentially being misused, execute one or more remedial actions.

A remedial action can be one or more actions performed with the intent of stopping misuse of digital content. For example, a remedial action can include terminating performance of digital content, suspending performance of digital content, disabling client-side digital content delivery device 106, gathering additional data to determine whether a suspected misuse of digital content is in fact a misuse of the content, etc.

A remedial action can be performed by digital content delivery system 104 and/or client-side digital content delivery device 106. As shown, digital content delivery system 104 includes remedial action module 118 configure to execute remedial actions. Likewise, client-side digital content delivery device 106 includes remedial action module 120 configured to execute remedial actions.

In some embodiments, a remedial action includes terminating performance of digital content, which causes the performance of digital content being performed by client-side digital content delivery device 106 to end. For example, remedial action module 118 can cause digital content delivery system 104 to stop transmitting (e.g., streaming, downloading, etc.) the digital content to client-side digital content delivery device 106, thereby terminating performance of the digital content. As another example, remedial action module 118 transmits a command to client-side digital content delivery device 106 to stop performing the digital content. As another example, remedial action module 120 causes client-side digital content delivery device 106 to terminate performance of the digital content.

In some embodiments, a remedial action includes causing client-side digital content delivery device 106 to suspend performance of digital content. In contrast to terminating performance of digital content, suspending performance includes pausing performance of the digital content. This can be for a specified period of time or until a command is received to resume performance. For example, digital content delivery system 104 transmits a command to client-side digital content delivery device 106 to resume performance of the suspended digital content. This can be the result of digital content delivery system 104 determining that the digital content is not being misused.

In some embodiments, a remedial action includes disabling client-side digital content delivery device 106. Disabling client-side digital content delivery device 106 causes client-side digital content delivery device 106 to be inoperable to perform any function by the user.

In some embodiments, a remedial action includes gathering additional information to determine whether a suspected misuse of digital content is in fact a misuse. Remedial action module 118 and/or remedial action module 120 can cause social media activity of one or more users associated with client-side digital content delivery device 106 to be scanned to gather information indicating that the user(s) are misusing digital content. For example, remedial action module 118 and/or remedial action module 120 can scan a user's social media activity for postings indicating that the user allowed unauthorized access to digital content (e.g., hosting viewing of movies for large audiences).

In some embodiments, a remedial action includes simply presenting a user with a warning or message indicating that the user is suspected of misusing digital content. Although several examples of remedial actions are given, these are just some examples and are not meant to be limiting.

Figure 2:
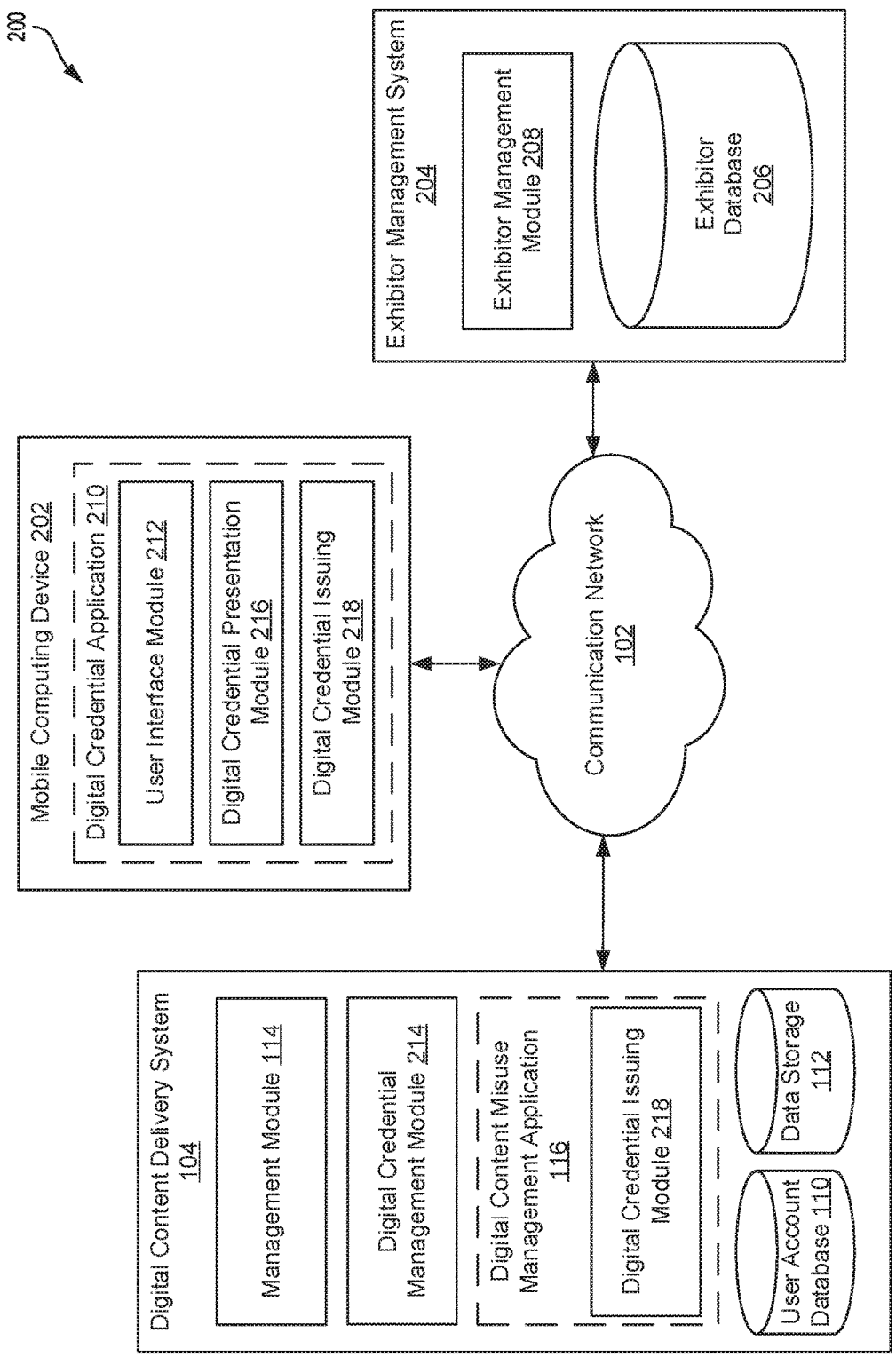
FIG. 2 shows an example system configured to issue digital credentials, according to certain example embodiments.

FIG. 2 shows an example system 200 configured to issue digital credentials (e.g., digital tickets), according to certain example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported to facilitate additional functionality that is not specifically described herein. Furthermore, the various functional modules depicted in FIG. 2 may reside on a single computing device or may be distributed across several computing devices in various arrangements such as those used in cloud-based architectures.

In some embodiments, digital content delivery system 104 issues digital credentials that are redeemable by a user. A digital credential is redeemed to provide a user with access to an exhibitor location, such as a movie theatre, to view a scheduled presentation of a digital content item (e.g., a movie).

In some embodiments, a digital content license acquired by a user allows the user to access the digital content item using client-side digital content delivery device 106 and/or attend a scheduled presentation of the digital content item at an exhibitor location. As an example, a user that purchases a movie rental that can be streamed to the user's client-side digital content delivery device 106 is also allotted two tickets (i.e., digital credentials) to view the movie at a movie theatre until the movie is no longer available. A user can therefore choose to view the movie rental at home and/or view the movie at a movie theater.

In some embodiments, the digital content license enabled the user to attend a scheduled presentation of an alternate digital content item in place of the digital content item associated with the digital content item. An alternate digital content item is a digital content item that is different than the digital content item associated with the digital content license. For example, a user that acquires a digital content license to access a first movie (i.e., the digital content item associated with the digital content license) can select to utilize the digital content license to attend a scheduled presentation of a second movie (i.e., the alternate content item) rather than the first movie.

In some embodiments, restrictions are placed on the alternate digital content item that a user can select in place of the content item associated with the digital content license acquired by the user. For example, the user can be restricted to selecting an alternate digital content item from a subset of digital content items based on one or more conditions, factors, etc. One such condition may dictate that a user may only select an alternate digital content item while scheduled presentations of the digital content item associated with the digital content license are currently available (e.g., while the movie is still showing in theatres). Accordingly, a user would not be able to select an alternate digital content item after scheduled presentations of the digital content item associated with the digital content license were no longer available (e.g., the movie was no longer showing in theatres).

In some embodiments, restrictions are based on a period of time that a digital content item has been released (e.g., an elapsed time from a predetermined priority time associated with the digital content item). For example, the user may be restricted to selecting alternate digital content items that have been released for at least a predetermined period of time (e.g., have been released for at least 2 weeks). Accordingly, a user cannot select an alternate digital content item that is a new release (e.g., released within the previous 2 weeks).

In some embodiments, the user is restricted to selecting an alternate digital content item that has been released for a longer period of time than the digital content item associated with the digital content license. For example, if the content item associated with the digital content license has been released for 1 week, the user would be restricted to selecting an alternate digital content item that has been released for over 1 week. Accordingly, a user would be restricted from selecting an alternate digital content item that is newer than (e.g., released after) the digital content item associated with the digital content license.

In some embodiments, restrictions are based on digital content item tiers. Digital content items are classified as being in a digital content item tier based on how long the digital content item has been released (e.g., within the previous 2 weeks, within the previous 2-4 weeks, within the previous 4-6 week, more than 6 weeks, etc.). In this type of embodiment, a user is restricted to selecting an alternate digital content item that is in a lower digital content item tier (e.g., has been released for a longer period of time) than the digital content item tier of the digital content item associated with the digital content license. For example, if the digital content item associated with the digital content license has been released within the previous 2 weeks, the user would be restricted to selecting an alternate digital content item from a lower digital content item tier, such as digital content items released within the previous 2-4 weeks, within the previous 4-6 weeks, etc. Accordingly, the user would not be able to select an alternate digital content item that was released within the previous 2 weeks.

In FIG. 2, digital content delivery system 104, mobile computing device 202, and exhibitor management system 204 communicate with each other via communication network 102 to reserve and issue digital credentials that can be redeemed by a user to access a scheduled presentation of a digital content item at an exhibitor location.

Exhibitor management system 204 is a computing system comprising one or more computing devices associated with a digital content exhibitor. An exhibitor is an organization, business, etc., that provides scheduled presentations of digital content at one or more exhibitor locations. For example, an exhibitor can be a movie theatre chain that provides scheduled showings of movies at one or more movie theaters.

Exhibitor management system 204 includes exhibitor database 206 that maintains exhibitor data describing scheduled presentations of digital content items provided by the exhibitor. Exhibitor data includes data identifying the exhibitor locations associated with the exhibitor (e.g., movie theatres), the digital content items scheduled for presentation at each exhibitor location (e.g., movies) and/or scheduled presentations at each exhibitor location (e.g., scheduled show times). Exhibitor data also includes data identifying digital credential availability for each scheduled presentation (e.g., number of unsold digital credentials available for purchase), seating charts for each exhibitor location, seating availability (e.g., unreserved seats), amenities provided by each exhibitor location, the address of each exhibitor location, etc. Exhibitor data also includes content associated with the exhibitor, exhibitor locations, and/or digital content items. For example, exhibitor data includes content such as written movie descriptions, movie trailers, movie reviews, movie theatre reviews, actors in a movie, movie directors, digital content item release dates, terms of use, etc.

Exhibitor management system 204 includes exhibitor management module 208 configured to reserve digital credentials and amenities for scheduled presentations of digital content items. Exhibitor management module 208 communicates with exhibitor database 206 to gather requested exhibitor data, provide requested exhibitor data to requesting computing devices and/or update exhibitor data to reflect a reservation of a digital credential and/or amenity. For example, exhibitor management module 208 processes read requests for exhibitor data such as show times for a specified movie, theatres within a predetermined geographic area that are presenting a specified movie, digital credential and/or seating availability for one or more scheduled presentations, available amenities at an exhibitor location, movie trailers, movie reviews, etc. In response to receiving a read request for exhibitor data, exhibitor management module 208 gathers the requested exhibitor data from exhibitor database 206 and return the requested exhibitor data in response to the read request.

Exhibitor management module 208 also processes reservation requests. A reservation request is a request to reserve digital credentials and/or amenities for a scheduled presentation of a digital content item. In response to receiving a reservation request, exhibitor management module 208 initially confirms whether the reservation request can be fulfilled. For example, exhibitor management module 208 determines whether there are a sufficient number of available digital credentials to fulfill the reservation request. As another example, exhibitor management module 208 determines whether selected seats are available to be reserved. If exhibitor management module 208 determines that the reservation request can be fulfilled, exhibitor management module 208 updates exhibitor database 206 to fulfill the request. For example, exhibitor management module 208 updates exhibitor database 206 to indicate that requested digital credentials have been reserved, updates the number of reserved digital credentials for the scheduled presentation, updates a seating chart to reflect that specific seats have been reserved, etc.

Exhibitor management module 208 also generates and provides reservation data reflecting that a requested reservation has been completed. Reservation data includes data indicating that the reservation request has been completed as well as data that can be used to redeem or confirm the reservation at an exhibitor location. For example, reservation data can include a unique code associated with reserved digital credentials, reserved seats, reserved amenities, etc., that can be used by an exhibitor to confirm the reservation. Reservation data also includes data describing the reservation, such as reserved seats, selected exhibitor location, selected scheduled presentation, reserved amenities (e.g., purchased food items), purchasing user, etc. In some embodiments, the reservation data is provided to a user for use at the exhibitor. The reservation data can also be provided directly to the exhibitor location.

In system 200, a user utilizes mobile computing device 202 to reserve a digital credential for a scheduled presentation of a digital content item, as well as reserve amenities. As shown, mobile computing device 202 includes digital credential application 210. Digital credential application 210 enables a user to communicate with digital content delivery system 104 to request exhibitor data as well as to reserve digital credentials and/or amenities. Digital credential application 210 includes user interface module 212 configured to present a user with an exhibitor interface including user interface elements (e.g., buttons, text fields, etc.) that a user can use to request and select data. For example, the exhibitor interface can provide a user with a listing of scheduled presentations for a digital content item and allow the user to reserve digital credentials to one or more of the listed scheduled presentations. As another example, the exhibitor interface can provide a user with a listing of unreserved seats for a scheduled presentation and allow the user to reserve one or more of the unreserved seats. As another example, the exhibitor interface can enable the user to enter and/or select one or more exhibitor data parameters (e.g., desired movie, desired theatre, desired day/time) and then provide the user with exhibitor data based on the exhibitor data parameters entered and/or selected by the user.

Digital credential application 210 can communicate with digital content delivery system 104 to perform one or more actions requested by the user, such as requests to read exhibitor data, requests to reserve digital credentials and/or amenities, etc. For example, digital credential application 210 can transmit requests to digital content delivery system 104 to perform specified actions, such as requests to read exhibitor data, requests to reserve digital credentials and/or amenities, etc. Digital credential application 210 can include data in the requests that can be used by digital content delivery system 104 to complete the request. For example, the request can include one or more exhibitor data parameters selected by the user.

Digital content delivery system 104 includes digital credential management module 214 configured to receive and respond to requests from mobile computing device 202. For example, digital content delivery system 104 can receive a request from mobile computing device 202 for specified exhibitor data and, in response, transmit a read request to exhibitor management system 204 for the specified exhibitor data. Digital content delivery system 104 provides the returned exhibitor data to mobile computing device 202, where it is presented to a user in an exhibitor interface.

As another example, digital credential management module 214 receives a request from mobile computing device 202 to reserve a digital credential to a scheduled presentation and/or reserve one or more amenities. In response, digital credential management module 214 transmits a reservation request to exhibitor management system 204 to reserve the digital credential and/or amenities.

Digital credential management module 214 receives reservation data from exhibitor management system 204 confirming that the requested reservation has been completed. In response, digital credential management module 214 updates the requesting user's account in user account database 110 to reflect that the user's requested reservation has been completed and that the requested digital credential and/or amenities are assigned to the requesting user's account. For example, digital credential management module 214 updates the requesting user's account with metadata describing the digital credentials assigned to the user's accounts, such as metadata describing a selected exhibitor location, selected scheduled presentation, selected seats, purchased amenities, etc. Digital credential management module 214 also stores any unique codes received from exhibitor management system 204 that can be used by a user to redeem the digital credentials assigned to the user's account and/or any reserved amenities.

In some embodiments, digital credential management module 214 provides a user with exhibitor data and/or reserves a digital credential for the user based on a digital content license assigned to the user's account. For example, a digital content license allows the user to access the digital content item using client-side digital content delivery device 106 and/or attend a scheduled presentation of the digital content item at an exhibitor location. In this type of scenario, a user that purchases a movie rental that can be streamed to the user's client-side digital content delivery device 106 is also allotted two digital credentials to view the movie at a movie theatre. A user can therefore choose to view the movie rental at home and/or view the movie at a movie theater.

A digital content license purchased and/or otherwise acquired by a user may be associated with a particular exhibitor. For example, the exhibitor can be an exhibitor that operates within a geographic region where the user resides. As another example, the exhibitor can be an exhibitor selected by the user as the user's preferred exhibitor. In some instances, the exhibitor may receive a portion of the revenue associated with the user's purchase of the digital content license to access the digital content item.

In this type of scenario, digital credential management module 214 presents the user with exhibitor data and/or reserves a digital credential based on the digital content license purchased by the user and assigned to the user's account. This includes enabling the user to reserve a digital credential for a scheduled presentation of the digital content item associated with the digital content license, a scheduled presentation offered at an exhibitor location associated with the digital content license and/or a scheduled presentation of an alternate digital content item. For example, digital credential management module 214 accesses the user's account in user account database 110 to identify a digital content license assigned to the user's account. Based on the digital content license, digital credential management module 214 determines a digital content item that the user has purchased a digital content license to access, alternate digital content items that the user can select, and/or an exhibitor or set of exhibitors associated with the digital content item. Digital credential management module 214 uses the determined digital content item and exhibitor to transmit a read request to exhibitor management system 204 for exhibitor data describing scheduled performances of the digital content item and/or alternate digital content items at exhibitor locations associated with the exhibitor. The returned exhibitor data identifies exhibitor locations and scheduled performances that the user is licensed to attend according to the digital content license assigned to the user's account. For example, the user can select to reserve digital credentials to any one of the scheduled performances presented to the user.

In some situations, an exhibitor may manage a large number of exhibitor locations, and thus providing the user with exhibitor data for all exhibitor locations may be excessive and/or unnecessary. In this type of situation, digital credential management module 214 provides the user with a subset of exhibitor data based on the location of the user in relation to exhibitor locations managed by the exhibitor. For example, digital credential management module 214 selects a subset of exhibitor locations that are within a predetermined geographic distance of a known dwelling of the user or, alternatively, a determined current location of the user. Digital credential management module 214 then provide the user with exhibitor data for the subset of exhibitor locations.

Once a digital credential has been reserved and assigned to a user's account, the user can use mobile computing device 202 to retrieve the digital credential. For example, the user can use the exhibitor interface to request that digital credentials assigned to the user's account be transmitted to mobile computing device 202. Digital credential application 210 includes digital credential presentation module 216 configured to receive a digital credential from digital content delivery system 104 and render a visual representation of the digital credential. Once rendered, the digital credential can be redeemed by a user to grant the user access to a selected scheduled presentation of the digital content item.

Digital content delivery system 104 utilizes one or more security measures to prevent misuse of digital credentials, such as digital credentials being issued to an incorrect user and/or the digital credential being utilized in violation of the terms of a digital license (e.g., the digital credential being redeemed by an incorrect user and/or the digital credential being resold).

Digital content misuse management application 116 includes digital credential issuing module 218 configured to prevent misuse of digital credentials. In some embodiments, digital credential application 210 include a portion of digital credential issuing module 218. In embodiments where digital credential application 210 includes a portion of the digital credential issuing module 218, digital credential application 210 works alone or in conjunction with the portion of digital credential issuing 210 included in the digital content delivery system 104.

Digital credential issuing module 218 restricts a user's access to digital credentials assigned to the user's account until one or more conditions are satisfied. One such condition is based on the location of the user in relation to an exhibitor location. For example, digital credential issuing module 218 requires that the user be located within a predetermined geographic distance of the exhibitor location at which the digital credential can be redeemed. Hence a user cannot access the digital credential until the user is nearby the exhibitor location.

In response to receiving a request to access a digital credential at mobile computing device 202, digital credential issuing module 218 determines whether a current location of mobile computing device 202 is within a predetermined geographic distance of the exhibitor location where the digital credential can be redeemed. Digital credential issuing module 218 accesses the user's account to gather metadata describing the geographic location of the exhibitor location. Digital credential issuing module 218 retrieves the current location of mobile computing device 202 from mobile computing device 202 (e.g., as part of a request received from mobile computing device 202 or in response to a separate request). Digital credential issuing module 218 uses the current location of mobile computing device 202 and the geographic location of the exhibitor location to determine whether the current location of mobile computing device 202 is within the predetermined geographic distance of the exhibitor location.

Another condition is based on the current time in relation to a start time of the scheduled presentation. For example, digital credential issuing module 218 can require that a remaining amount of time until a start time of the scheduled presentation be less than a threshold amount of time. Hence a user cannot access the digital credential until a short time before the start of the scheduled presentation. Digital credential issuing module 218 accesses the user's account to gather metadata describing the scheduled start time of the scheduled presentation and determine whether a remaining amount of time until the scheduled start time (e.g., a time duration between the current time and the scheduled start time) is less than the threshold amount of time.

Another condition is based on the requesting mobile computing device. For example, digital credential issuing module 218 restricts access to the digital credential to one or more mobile computing devices authorized with the user's account. In some embodiments, device identifiers for the authorized mobile computing device(s) are stored in the user's account. Digital credential issuing module 218 requests a device identifier from a mobile computing device 202 requesting digital credentials and then accesses the user's account to determine whether the device identifier received from mobile computing device 202 is included in the list of authorized device identifiers.

Digital credential issuing module 218 denies a request to issue a digital credential if one or more of the described conditions are not satisfied. For example, digital credential issuing module 218 can require that all conditions be satisfied for the request to be approved (e.g., the user be located nearby the theatre, the movie to start shortly and the requesting mobile computing device be authorized on the user's account). Alternatively, in some embodiments, digital credential issuing module 218 requires that at least one or two of the conditions be satisfied for the request to be approved.

If digital credential issuing module 218 determines that a sufficient number of conditions have been satisfied, digital credential issuing module 218 transmits the digital credential to mobile computing device 202. This includes gathering and providing reservation data associated with the digital credential to mobile computing device 202. For example, digital credential issuing module 218 accesses the user's account to access the reservation data associated with the digital credential.

Once the reservation data is received by mobile computing device 202, digital credential presentation module 216 uses the reservation data to render a graphical representation of the digital credential, such as scannable code (e.g., Quick Response (QR) code, bar code, number code etc.). The scannable code is embedded with reservation data that is used to confirm the user's reservation. For example, the scannable code is embedded with the unique code associated with the reservation of the digital credentials, the number of digital credentials purchased, reserved seats, purchaser name, etc. The scannable code can be scanned at an exhibitor location using a scanning device capable of reading the scannable code to retrieve the reservation data embedded in the scannable code. Alternatively, the scannable code can include a readable code (e.g., combination of number, letters, symbols, etc.) that an employee can read and/or manually enter into a computing device to retrieve the reservation data.

In some embodiments, digital credential issuing module 218 causes presentation of an obfuscated rendering of a digital credential when one or more conditions have not been satisfied, and then present a clear rendering of the digital credential when the conditions have been satisfied. An obfuscated rendering is a visual rendering of the digital credential that has been sufficiently obfuscated (e.g., blurred, modified, etc.) such that the digital credential (e.g., scannable code) cannot be read and/or scanned by a scanning device or employee at the exhibitor location. In contrast, a clear rending of the digital credential is a visual rending of the digital credential that is sufficiently clear such that the digital credential can be scanned by a scanning device and/or read by an employee at the exhibitor location. Accordingly, the visual rendering of the digital credential can only be redeemed by the user after the conditions have been met.

In some embodiments, digital credential issuing module 218 continues to monitor the location of client device 202 and/or the current time and restricts access to the digital credentials if the conditions are no longer met. For example, if the user leaves the vicinity of the movie theatre and/or the specified period of time has passed. Digital credential issuing module 218 restricts access to the digital credentials by, for example, removing the clear rendering of the digital credential or replacing the clear rending of the digital credential with an obfuscated rendering of the digital credential.

In addition to restricting access to digital credentials until one or more conditions are satisfied, digital credential issuing module 218 further implements one or more security features into the visual rendering of the digital credential to prevent misuse. For example, digital credential issuing module 218 includes image data in the digital credential that, when rendered by mobile computing device 202, causes an image of the user associated with the user account to be presented along with the digital credential. An employee at an exhibitor location can therefore visually verify that the user attempting to redeem the digital credential is the user associated with the user account.

As another example, digital credential issuing module 218 includes video data in the digital credential that, when rendered by mobile computing device 202, causes a video and/or animation to be presented along with the digital credential. This prevents users from creating counterfeit copies of the digital credential by taking a picture and/or screen grab of the rendered digital credential.

Figure 3:
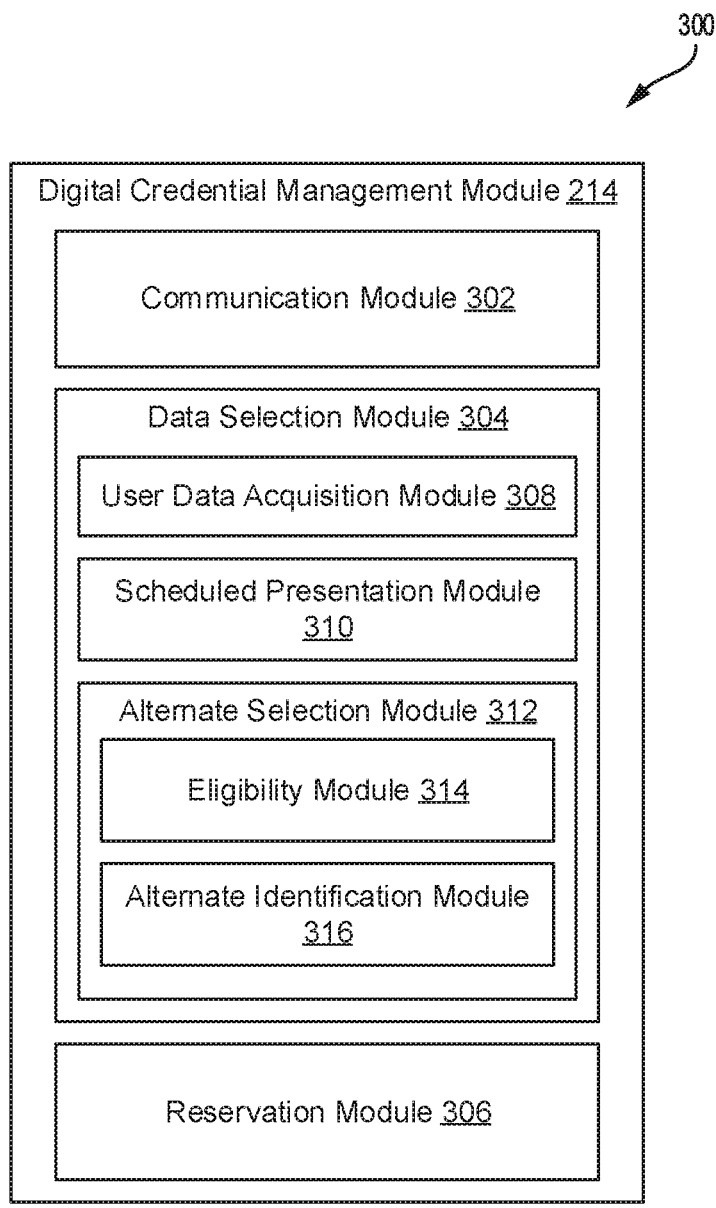
FIG. 3 shows a block diagram of the digital credential management module, according to certain example embodiments.

FIG. 3 shows a block diagram 300 of the digital credential management module 214, according to certain example embodiments. Digital credential management module 214 is shown as including communication module 302, data selection module 304 and reservation module 306. As shown, data selection module 304 includes user data acquisition module 308, scheduled presentation module 310 and alternate selection module 312. Further, alternate selection module 312 includes eligibility module 314 and alternate identification module 316. The various modules of digital credential management module 214 are configured to communicate with each other (e.g., via a bus, shared memory, or a switch). Any one or more of these modules may be implemented using one or more computer processors (e.g., by configuring such one or more computer processors to perform functions described for that module) and hence may include one or more of the computer processors.

Any one or more of the modules described may be implemented using hardware alone (e.g., one or more of the computer processors 1004 of a machine (e.g., machine 1000)) or a combination of hardware and software. For example, any described module of digital credential management module 214 may physically include an arrangement of one or more of the computer processors 1004 (e.g., a subset of or among the one or more computer processors of the machine (e.g., machine 1000)) configured to perform the operations described herein for that module. As another example, any module of digital credential management module 214 may include software, hardware, or both, that configure an arrangement of one or more computer processors 1004 (e.g., among the one or more computer processors of the machine (e.g., machine 1000)) to perform the operations described herein for that module. Accordingly, different modules of digital credential management module 214 may include and configure different arrangements of such computer processors 1004 or a single arrangement of such computer processors 1004 at different points in time. Moreover, any two or more modules of digital credential management module 214 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Communication module 302 provides various communication functionality. For example, communication module 302 receives and transmits messages, requests, data, etc., with mobile computing device 202 and/or exhibitor management system 204. In a specific example, communication module 302 receives read requests from mobile computing device 202 and returns requested data. Likewise, communication module 302 transmits read and/or reservation requests to exhibitor management system 204 as well as receives resulting returned data from exhibitor management system 204.

Data selection module 304 determines a set of exhibitor data to provide in response to a read request. For example, in response to receiving a read request from mobile computing device 202, data selection module 304 can determine a set of exhibitor data to be returned based on data associated with a requesting user (e.g., user's location) and/or a content license acquired by the user. Once a set of exhibitor data is determined by data selection module 304, communication module 302 requests the selected exhibitor data from exhibitor management system 204 and provide the requested data to mobile computing device 202.

As shown, data selection module 304 includes user data acquisition module 308. User data acquisition module 308 gathers user data associated with a requesting user. User data includes any data associated with a requesting user and/or the user's account, such as the user's current location, a known dwelling of the user, the user's preferences, the user's purchase history, content licenses acquired by the user, etc.

User data acquisition module 308 acquires user data from mobile computing device 202 and/or user account database 110. For example, user data acquisition module 308 can receive user data as part of a read request received from mobile computing device 202. User data acquisition module 202 also queries mobile computing device 202 for user data. User data acquired from mobile computing device 202 includes contextual data describing a current state of the user, such as location data indicating the current location of mobile computing device 202.

User data acquisition module 308 further acquires user data from the user's profile. For example, user data acquisition module 308 can communicate with user account database 110 to access the user's profile and gather user data maintained in the user's profile. The user data maintained by the user's profile includes content data describing the user, such as a dwelling associated with the user (e.g., home address), user preferences, purchase history, etc. Further, the user's profile includes content licenses acquired by the user. Each content license can identify the digital content item associated with the digital content license, as well as data defining the terms and conditions of the digital content license. The terms and conditions of the digital content license can define whether the user is allotted digital credentials to attend a scheduled presentation of the digital content, as well whether the user can select an alternate digital content item and any conditions associated with doing so.

Scheduled presentation module 310 utilizes user data to determine scheduled presentations of a digital content item to provide to a user. For example, scheduled presentation module 310 identifies a subset of available scheduled presentations based on an exhibitor associated with the digital content license and/or a geographic location associate with the user. Scheduled presentation module 310 provides parameters to communication module 302 to request corresponding exhibitor data. For example, scheduled presentation module 310 provides communication module 302 with data identifying an exhibitor and/or set of exhibitor locations. Communication module 302 utilizes the parameters to query exhibitor management system 204 for corresponding exhibitor data, such as data identifying scheduled presentations of the digital content item offered by the exhibitor and/or the set of exhibitor locations.

Alternate selection module 312 provides a user with data to select an alternate digital content item. A digital content license acquired by a user may allow the user to attend a scheduled presentation of the digital content item or a scheduled presentation of an approved alternate digital content item. Accordingly, a user that acquired a digital content license for a first movie, may be able select to attend a scheduled presentation of an alternate movie in place of a scheduled presentation of the first movie.

Whether a user can select an alternate digital content item is dependent on terms and conditions associated with the digital content license acquired by the user. For example, the terms and conditions dictate eligibility requirements that must be satisfied for a user to select an alternate digital content item, as well as restrictions on the digital content items that can be selected as an alternate digital content item.

Eligibility module 314 determines whether a digital content license acquired by the user is eligible for use to select an alternate digital content item (e.g., whether the eligibility requirements are satisfied). If eligibility module 314 determines that a digital content license is not eligible (e.g., the eligibility requirements are not satisfied), the user cannot utilize the digital content license to select an alternate digital content item. Accordingly, the digital content license would provide the user access to only the digital content item associated with the digital content license.

In some embodiments, a digital content license simply dictates whether the acquiring user can select an alternate digital content. For example, some digital content licenses may not provide a user with a right to select an alternate digital content item. In this type of embodiments, eligibility module 314 accesses the digital content license to determine whether the digital content license provides the user with a right to select an alternate digital content item. If the digital content license does not provide the right, eligibility module 314 determines that the digital content license is not eligible.

In some embodiments, the eligibility requirements require that the scheduled presentations of the digital content item associated with the digital content license be currently offered by exhibitors (e.g., that the movie be currently showing in theatres). Accordingly, a user would be restricted from selecting to attend a scheduled presentation of an alternate digital content item if scheduled presentations of the digital content item associated with the digital content license were no longer available (e.g., the movie was no longer being shown in theatres). Eligibility module 314 requests, via communication module 302, exhibitor data associated with the digital content item to determine whether scheduled presentations of the digital content item are still available.

In some embodiments, the eligibility requirements are based on a length of time that the digital content item has been released. The length of time that a digital content item has been released is an elapsed period time from a predetermined priority time associated with the digital content item. The predetermined priority time is a predetermined time associated or otherwise assigned to a digital content item by, for example, a content owner, exhibitor, etc. For example, the predetermined priority time can correspond to an earliest release date of a digital content item in theatres.

The eligibility requirements can require that a length of time that a digital content item has been released be less than a threshold period of time for the digital content license to be eligible. Accordingly, a user would not be able to select an alternate digital content item if the period of time that the digital content item has been released is greater than the threshold period of time. As an example, the eligibility requirements can dictate that an alternate digital content item can be selected only within the first two weeks of the release date of the digital content item associated with the digital content license.

The predetermined priority time associated with a digital content item can be included in the digital content license and/or gathered from exhibitor management system 204. Eligibility module 314 gathers the predetermined priority time and compares it to a current time to determine the period of time that the digital content item has been released. Eligibility module 314 then determines whether the period of time that the digital content item has been released exceeds the predetermined threshold period of time.

Alternate identification module 316 determines which digital content items a user can select as an alternate digital content item. In some embodiments, a digital content license that is eligible may dictate further conditions or restrictions on which digital content items can be selected as an alternate digital content item. Alternate identification module 316 identifies a set of digital content items that a user can select as an alternate digital content item under the terms and conditions of the digital content license. The set of digital content items can be transmitted to mobile computing device 202, where they can be presented to the user. The user can then select an alternate digital content item if so desired.

In some embodiments, restrictions can be based on the length of time that the digital content items have been released. For example, the user may be restricted to selecting alternate digital content items that have been released for at least a predetermined period of time (e.g., have been released for at least 2 weeks). Accordingly, a user cannot select an alternate digital content item that is a new release (e.g., released within the previous 2 weeks).

In some embodiments, the user may be restricted to selecting an alternate digital content item that has been released for a length of time that is greater than the length of time the digital content item associated with the digital content license has been released. For example, if the content item associated with the digital content license has been released for 1 week, the user would be restricted to selecting an alternate digital content item that has been released for over 1 week. Accordingly, a user would be restricted from selecting an alternate digital content item that is newer than (e.g., released after) the digital content item associated with the digital content license.

In some embodiments, restrictions are based on digital content item tiers. Digital content items are classified as being in a digital content item tier based on a period of time that the digital content item has been released (e.g., within the previous 2 weeks, within the previous 2-4 weeks, within the previous 4-6 week, more than 6 weeks, etc.). In this type of embodiment, a user is restricted to selecting an alternate digital content item that is in a lower digital content item tier (e.g., has been released for a longer period of time) than the digital content item tier of the digital content item associated with the digital content license. For example, if the digital content item associated with the digital content license has been released within the previous 2 weeks, the user would be restricted to selecting an alternate digital content item from a lower digital content item tier, such as digital content items released within the previous 2-4 weeks, within the previous 4-6 weeks, etc. Accordingly, the user would not be able to select an alternate digital content item that was released within the previous 2 weeks.

Reservation module 306 reserves digital credentials to a scheduled presentation of a digital content item. For example, reservation module 306 causes reservation requests to be provided to Exhibitor management system 204 to reserve digital credentials to a selected scheduled presentation of a digital content item. Reservation module 306 also updates the user's profile in user account database 110 with any reservation information, including data identifying the selected scheduled presentation (e.g., time, location, digital content item), as well as data associated with the digital credentials (e.g., unique code).

Figure 4:
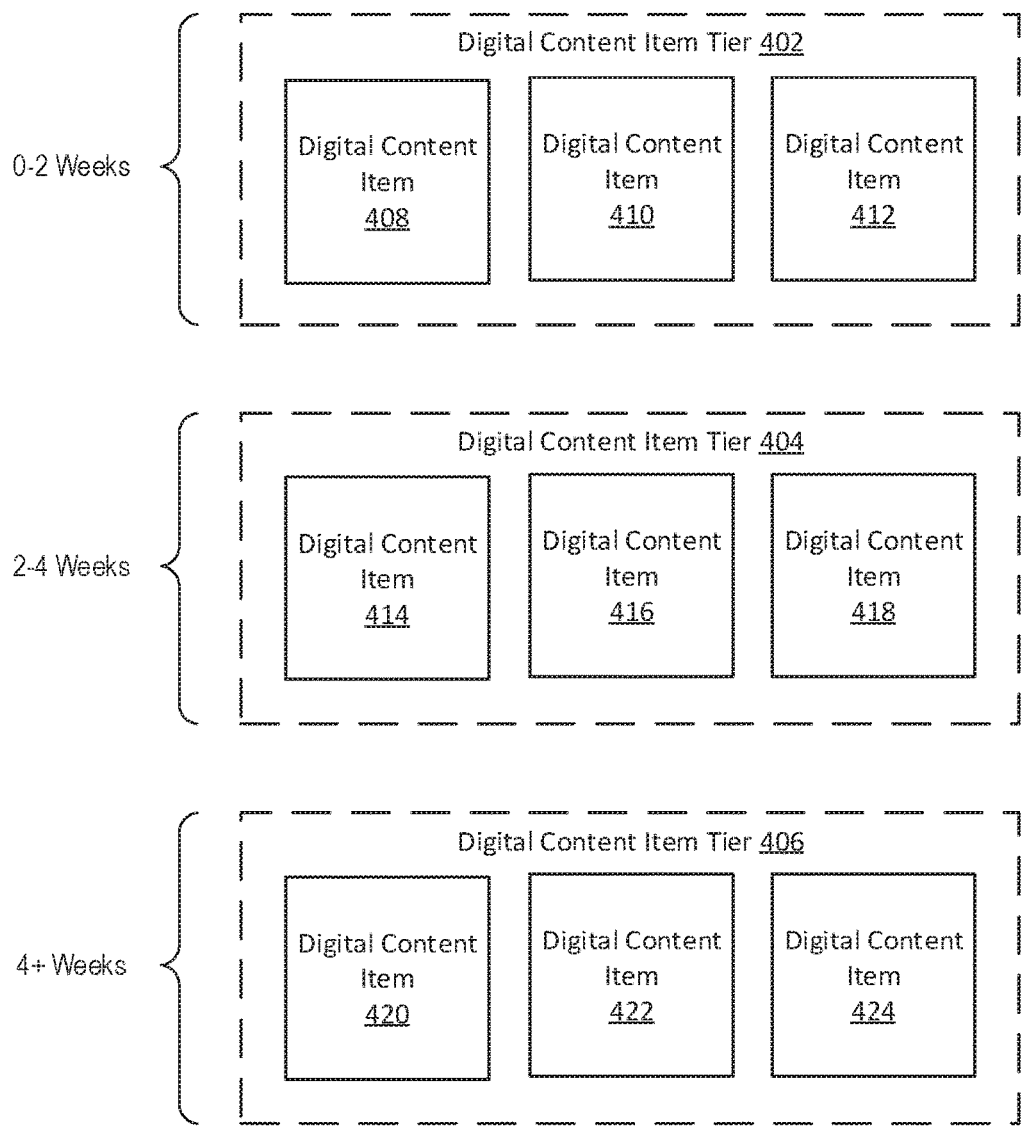
FIG. 4 illustrates selecting an alternate digital content item based on digital content item tiers, according to certain example embodiments.

FIG. 4 illustrates selecting an alternate digital content item based on digital content item tiers, according to certain example embodiments. In FIG. 4, three digital content item tiers 402, 404 and 406 are shown. Each digital content item tier is associated with a period of time that the digital content items included in the digital content item tier have been released. For example, digital content item tier 402 is associated with a time period of less than 2 weeks, digital content item tier 404 is associated with a time period of 2-4 weeks, and digital content item tier 406 is associated with a period of more than 4 weeks. Accordingly, digital content items 408, 410 and 412 included in digital content item tier 402 have all been released for less than 2 weeks, digital content items 414, 416 and 418 included in digital content item tier 404 have been released for 2 to 4 weeks, and digital content items 420, 422 and 424 included in digital content item tier 406 have been released for over 4 weeks.

It should be noted that as time passes, the digital content item tier that a digital content item is included in may change. For example, a digital content item will initially be included in digital content item tier 402 upon being released. After two weeks, the digital content item will be included in digital content item tier 404 and removed from digital content item tier 402. Finally, after 2 more week (i.e., after 4 weeks from the original release date), the digital content item will be included in digital content item tier 406 rather than digital content item tier 404.

In some embodiments, the terms and conditions associated with a digital content license dictate that an alternate digital content item may only be selected from a lower digital content item tier. Digital content item tiers are ordered based on the period of time the content items in the digital content item tier have been released, such that the highest digital content item tier includes the digital content items that have been released for the shortest period of time. Accordingly, digital content item tier 402 is ordered as the highest tier, followed by digital content item tier 404 and then digital content item tier 406.

A user that has acquired a digital content license to digital content item 408, which is included in digital content item tier 402, may be restricted to selecting an alternate digital content item from digital content item tiers 404 and 406. Hence the user would not be able to select digital content items 410 or 412 as an alternative digital content item.

As another example, a user that has acquired a digital content license to digital content item 414, which is included in digital content item tier 404, is restricted to selecting an alternate from digital content item tier 406. Hence the user would only be able to choose one of digital content items 420, 422 or 424 as an alternate digital content item. The user would not be able to select digital content items from digital content item tiers 402 or 404 as an alternative digital content item.

Although three digital content item tiers are shown in FIG. 4, this is only one example and is not meant to be limiting. Any number of digital content item tiers can be used, and this disclosure contemplates all such embodiments.

Figure 5:
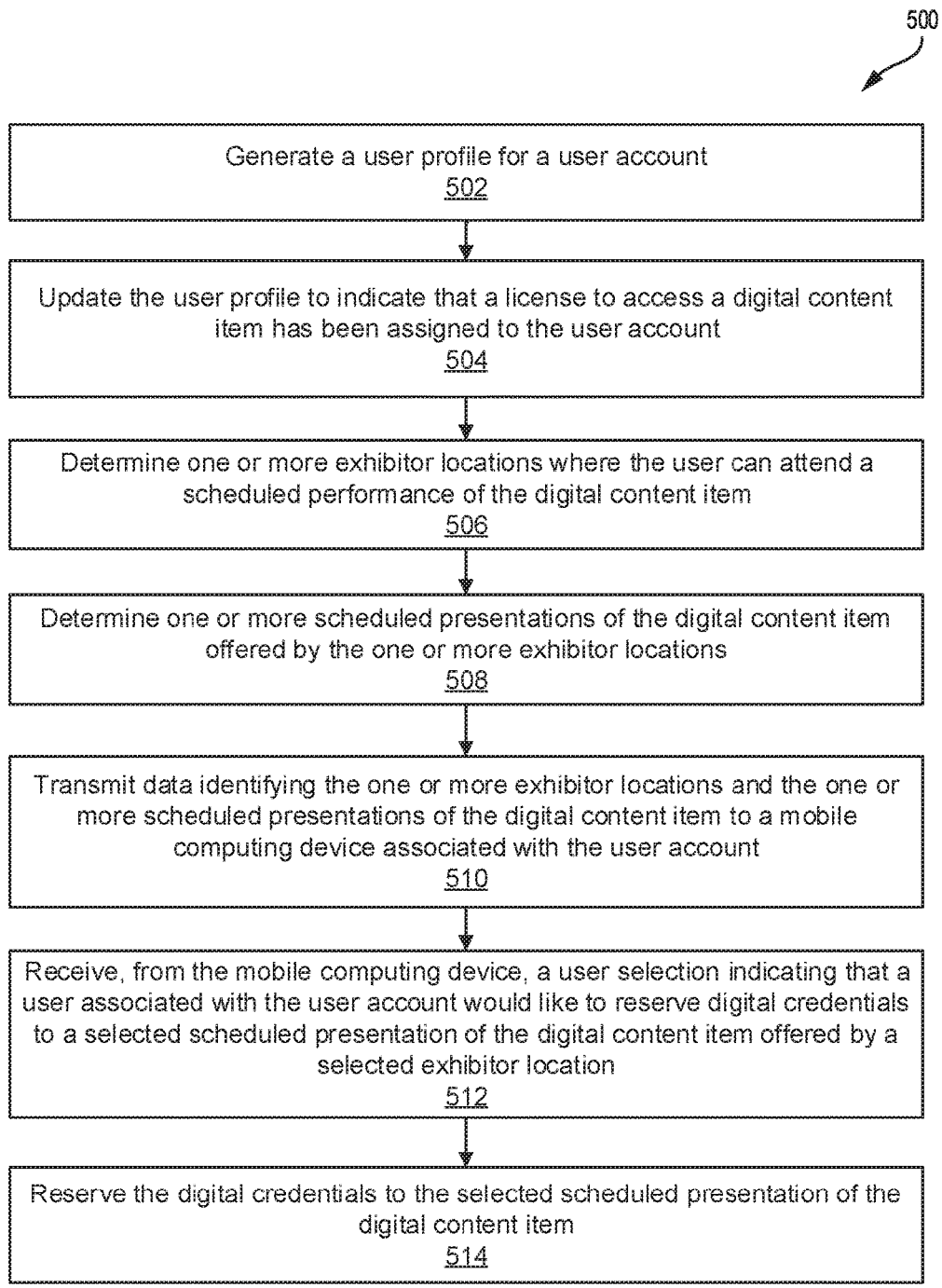
FIG. 5 shows an example method for reserving digital credentials to a scheduled presentation of a digital content item, according to certain example embodiments.

FIG. 5 shows an example method 500 for reserving digital credentials to a scheduled presentation of a digital content item, according to certain example embodiments. Method 500 may be embodied in computer readable instructions for execution by one or more computer processors such that the operations of method 500 may be performed in part or in whole by digital content delivery system 104; accordingly, method 500 is described below by way of example with reference thereto. However, it shall be appreciated that at least some of the operations of method 500 may be deployed on various other hardware configurations and method 500 is not intended to be limited to digital content delivery system 104.

At operation 502, digital content delivery system 104 generates a user profile for a user account. The generated user profile is stored in user account database 110 maintained by digital content delivery system 104.

At operation 504, digital content delivery system 104 updates the user profile to indicate that a digital content license to access a digital content item has been assigned to the user account. The digital content license is a license to access and present a movie through client-side digital content delivery device 106 that is associated with the user account. The digital content license further enables a user to attend a scheduled performance of the digital content item.

At operation 506, digital content delivery system 104 determines one or more exhibitor locations where the user can attend a scheduled performance of the digital content item. Digital content delivery system 104 determines an exhibitor associated with the digital content license assigned to the user account. For example, the exhibitor can be associated with the purchase of the digital content license and, in some embodiments, received a portion of revenue from the purchase for the digital content license to access the digital content item. Once digital content delivery system 104 determines the exhibitor associated with the digital content license, digital content delivery system 104 can determine exhibitor locations associated with the exhibitor. This can include identifying all exhibitor locations associated with the exhibitor or a subset of the exhibitor locations. For example, digital content delivery system 104 determines exhibitor locations that are located within a predetermined geographic distance of a dwelling associated with the user account.

At operation 508, digital content delivery system 104 determines one or more scheduled presentations of the digital content item offered by the one or more exhibitor locations. For example, digital content delivery system 104 determines show times at which the digital content (e.g., movie) is playing at various movie theatres.

At operation 510, digital content delivery system 104 transmits data identifying the one or more exhibitor locations and the one or more scheduled presentations of the digital content item to mobile computing device 202 that is associated with the user account. Mobile computing device 202 renders a visual representation of the data and enables a user to browse through the available scheduled presentations as well as select to reserve digital credentials to a scheduled presentation.

At operation 512, digital content delivery system 104 receives, from mobile computing device 202, a user selection indicating that a user associated with the user account would like to reserve digital credentials to a selected scheduled presentation of the digital content item offered by a selected exhibitor location.

At operation 514, digital content delivery system 104 reserves the digital credentials to the selected scheduled presentation of the digital content item. For example, digital content delivery system 104 transmits a reservation request to exhibitor management system 204 to reserve the digital credentials. Digital content delivery system 104 additionally updates the user's account to assign the reserved digital credentials to the users account. This includes updating the user's account with any reservation data received from exhibitor management system 204.

Figure 6:
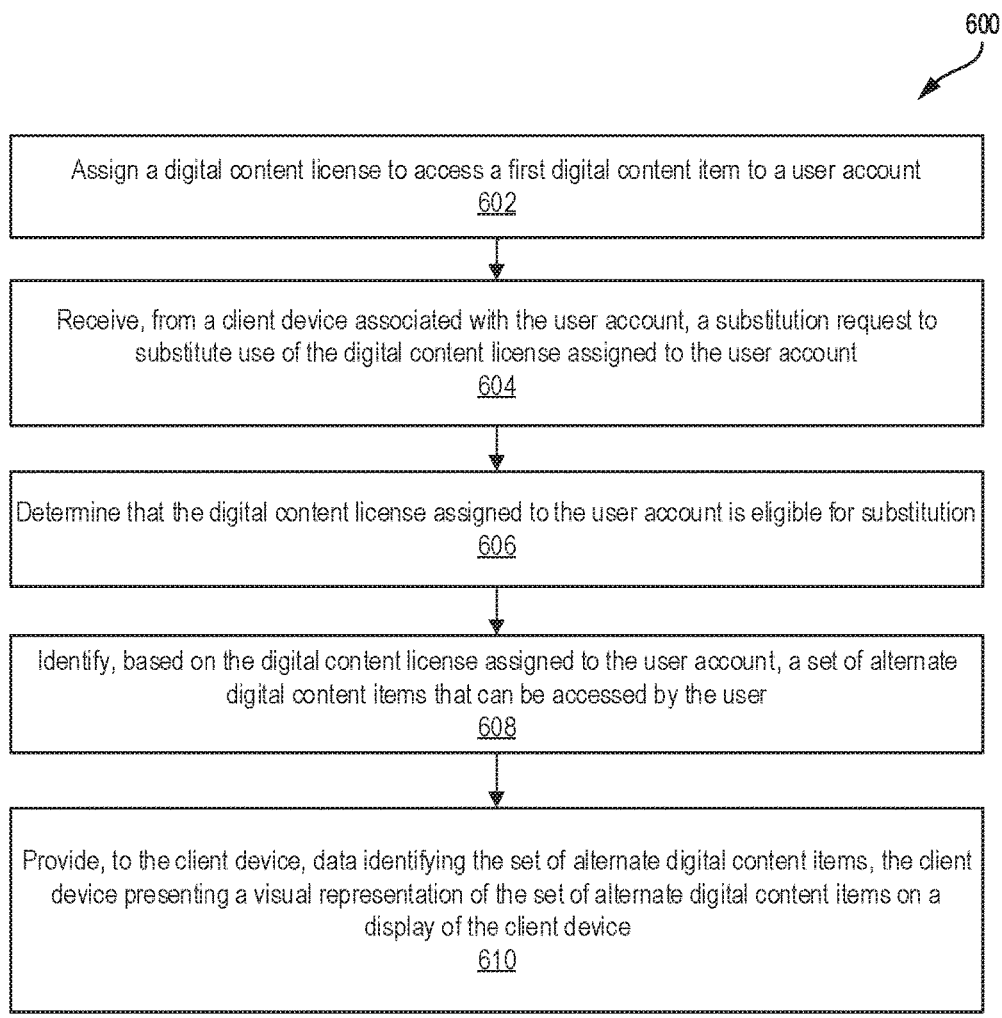
FIG. 6 shows an example method for selecting an alternate digital content item, according to certain example embodiments.

FIG. 6 shows an example method 600 for selecting an alternate digital content item, according to certain example embodiments. Method 600 may be embodied in computer readable instructions for execution by one or more computer processors such that the operations of method 600 may be performed in part or in whole by digital content delivery system 104; accordingly, the method 600 is described below by way of example with reference thereto. However, it shall be appreciated that at least some of the operations of method 600 may be deployed on various other hardware configurations and method 600 is not intended to be limited to digital content delivery system 104.

At operation 602, management module 114 assigns a digital content license to access a first digital content item to a user account. The digital content license to access the first digital content item permits a user of the user account to attend a scheduled presentation of the first digital content item at an exhibitor location and access the first digital content item from a client-side digital content delivery device 106 associated with the user account. In some embodiments, the digital content item is a movie and the selected exhibitor location is a movie theatre. For example, a user that purchases a movie rental may also be allotted two tickets to view the movie in a theatre.

At operation 604, communication module 302 receives, from a client device 202 associated with the user account, a substitution request to substitute use of the digital content license assigned to the user account. The substitution request indicates that the user would like utilize the digital content license assigned to the user account to secure digital credentials to attend a scheduled presentation of an alternate digital content item that is different than the first digital content item associated with the digital content license.

At operation 606, eligibility module 314 determines that the digital content license assigned to the user account is eligible for substitution. In some embodiments, the eligibility module 314 determines that the digital content license to the first digital content item is eligible to attend the scheduled presentation of the alternate digital content item by determining that an elapsed period of time between a predetermined priority time of the first digital content item and a current time is less than a threshold period of time. The predetermined priority time of the first digital content item can be a release date of the first digital content item or, alternatively, a time selected by a content owner of the first content item.

In some embodiments, eligibility module 314 determines that the digital content license to the first digital content item is eligible to attend the scheduled presentation of the alternate digital content item by determining that the digital content license to the first digital content item has not expired. For example, the digital content license can be associated with a predetermined expiration date and/or time. Eligibility module 314 can compare the expiration date and/or time to the current time to determine whether the digital content license has expired.

At operation 608, alternate identification module 314 identifies, based on the digital content license assigned to the user account, a set of alternate digital content items that can be accessed by the user. The digital content license can define terms and/or conditions for selection of an alternate content item. For example, the digital content item can dictate that alternate digital content items have been released earlier than the digital content item associated with the digital content license. Accordingly, to determine whether a digital content item can be selected as an alternate digital content item, alternate identification module 314 can determine whether an elapsed period of time between a predetermined priority time of the digital content item and the current time is greater than the threshold period of time.

At operation 610, communication module 302 provides, to client device 202, data identifying the set of alternate digital content items. Client device 202 presents a visual representation of the set of alternate digital content items on a display of client device 202. The user can then use the presented data to select an alternate digital content item if so desired.

Figure 7:
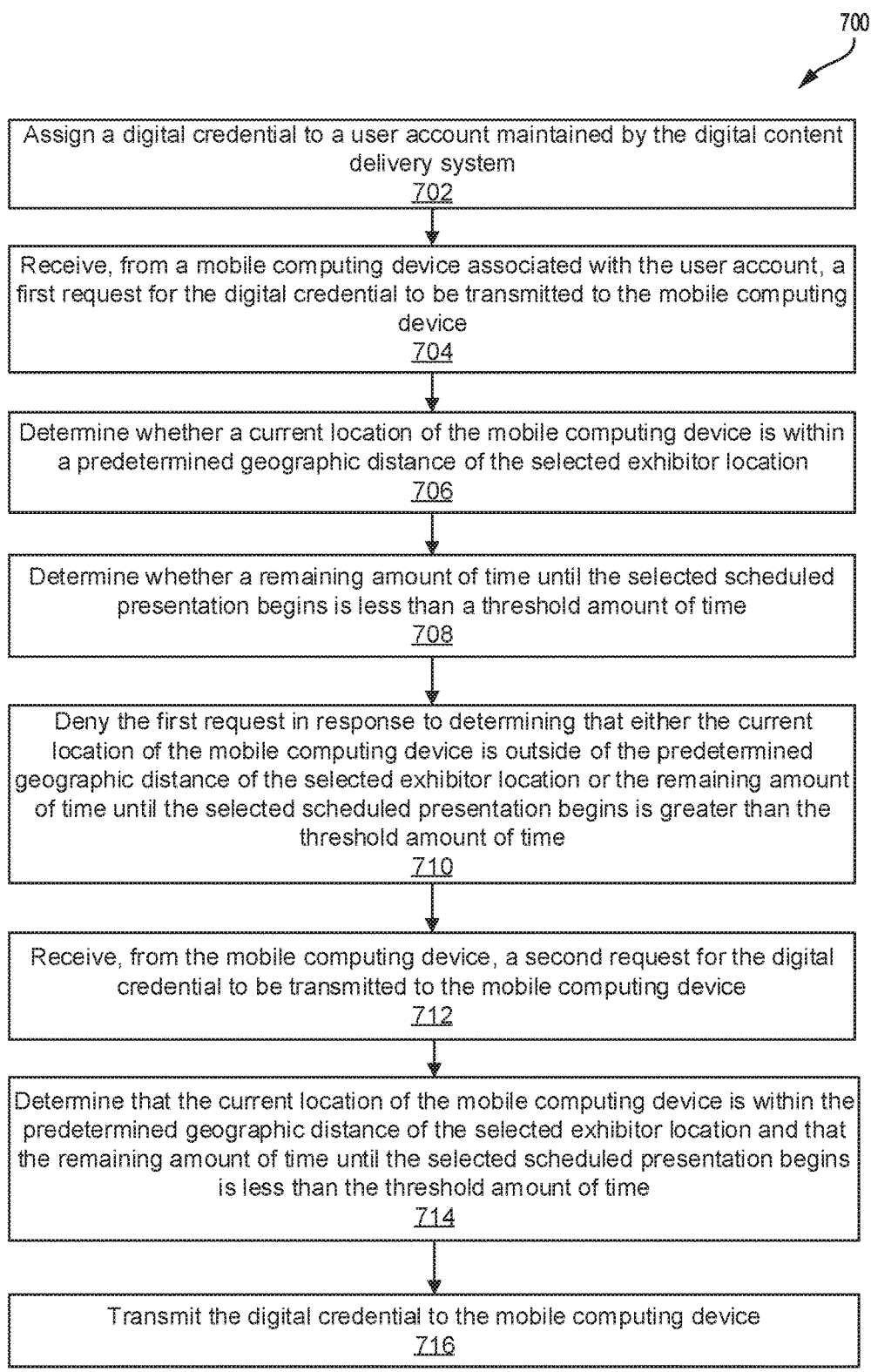
FIG. 7 shows an example method for issuing digital credentials, according to certain example embodiments.

FIG. 7 shows an example method 700 for issuing digital credentials, according to certain example embodiments. Method 700 may be embodied in computer readable instructions for execution by one or more computer processors such that the operations of method 700 may be performed in part or in whole by digital content delivery system 104; accordingly, the method 700 is described below by way of example with reference thereto. However, it shall be appreciated that at least some of the operations of method 700 may be deployed on various other hardware configurations and method 700 is not intended to be limited to digital content delivery system 104.

At operation 702, digital credential management module 214 assigns a digital credential to a user account maintained by digital content delivery system 104. For example, digital credential management module 214 updates a user account with reservation data associated with the digital credential. The digital credential is redeemable at a selected exhibitor location to view a selected scheduled presentation of a digital content item. For example, the digital credential can be redeemed at a selected theatre to view a scheduled movie.

A digital content license to access the digital content item may have been previously assigned to the user account. For example, the user may have previously purchased a digital content license to rent the digital content item and view the digital content item using client-side digital content delivery device 106. The purchased license can also provide the user with the right to view a scheduled presentation of the digital content item at an exhibitor location. For example, the purchased license can allow a user to attend a screening of the movie at a selected movie theatre.

At operation 704, digital content delivery system 104 receives a first request for the digital credential to be transmitted to mobile computing device 202. Mobile computing device 202 is associated with the user account.

At operation 706, digital credential issuing module 218 determines whether a current location of mobile computing device 202 is within a predetermined geographic distance of the selected exhibitor location. In some embodiments, the first request received from mobile computing device 202 includes location data describing the current location of mobile computing device 202. Digital credential issuing module 218 uses the received location information to determine whether the current location of mobile computing device 202 is within a predetermined geographic distance of the selected exhibitor location.

At operation 708, digital credential issuing module 218 determines whether a remaining amount of time until a scheduled start time of the selected scheduled presentation is less than a threshold amount of time. For example, digital credential issuing module 218 determines a current time and the scheduled start time of the selected scheduled presentation. Digital credential issuing module 218 determines whether an amount of time between the current time and the scheduled start time is less than a threshold amount of time.

At operation 710, digital credential issuing module 218 denies the first request in response to determining that either the current location of mobile computing device 202 is outside of the predetermined geographic distance of the selected exhibitor location or the remaining amount of time until the scheduled start time of the selected scheduled presentation is greater than the threshold amount of time. As a result of the first request being denied, mobile computing device 202 will not receive and/or render the digital credential in response to the first request.

At operation 712, digital credential issuing module 218 receives, from mobile computing device 202, a second request for the digital credential assigned to be transmitted to mobile computing device 202. The second request is received after the first request was denied. The second request also includes location data indicating the current location of mobile computing device 202.

At operation 714, digital credential issuing module 218 determines that the current location of mobile computing device 202 is within the predetermined geographic distance of the selected exhibitor location and that the remaining amount of time until the scheduled start time of the selected scheduled presentation is less than the threshold amount of time.

At operation 716, digital credential issuing module 218 transmits the digital credential to mobile computing device 202. After receiving the digital credential, mobile computing device 202 renders a visual representation of the digital credential on a display of mobile computing device 202, which can be redeemed to provide a user access to the selected scheduled presentation.

Figure 8A:
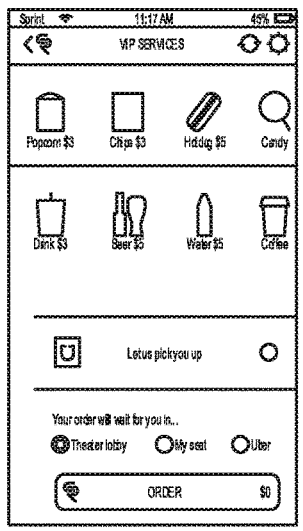
FIGS. 8A-8L are screenshots showing example screenshots of an exhibitor interface, according to certain example embodiments.

FIGS. 8A-8L show example screenshots of an exhibitor interface, according to certain example embodiments. As shown in FIG. 8A, the exhibitor interface enables a user to reserve one or more amenities. For example, the user can use the exhibitor interface to select from and purchase food and/or beverages, as well as select a pickup location for the purchased food and/or beverages. The exhibitor interface allows a user to schedule transportation to and/or from a scheduled presentation of a digital content item.

Figure 8B:
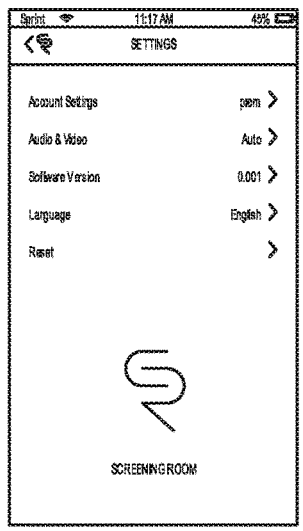

As shown in FIG. 8B, the exhibitor interface allows a user to view and/or adjust configurations or settings. For example, the exhibitor interface allows the user to view and/or adjust account settings, audio and video settings, software version and language settings. The exhibitor interface also allows the user to reset the settings to their default settings.

Figure 8C:
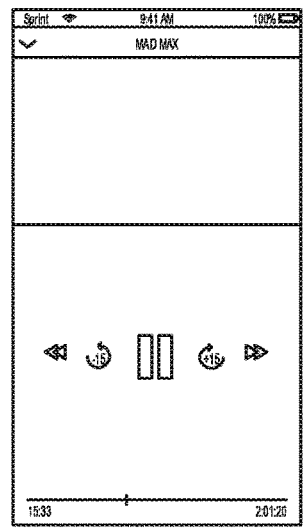

As shown in FIG. 8C, the exhibitor interface presents a user with video. For example, the exhibitor interface allows the user to view movie trailers, reviews, etc. The exhibitor interface also allows the user to control presentation of the video, such as fast forward, rewind, pause, play, etc.

Figure 8D:
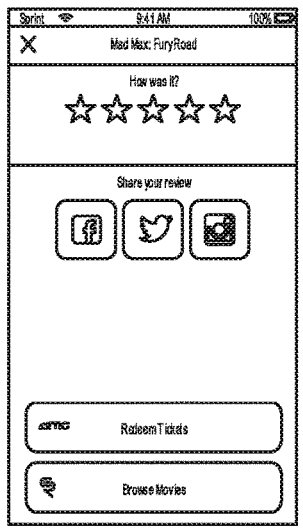

As shown in FIG. 8D, the exhibitor interface enables the user to perform one or more functions. For example, the exhibitor interface enables the user to review a digital content item, share the review via one or more social networking services, redeem digital credentials and/or browse movies.

Figure 8E:
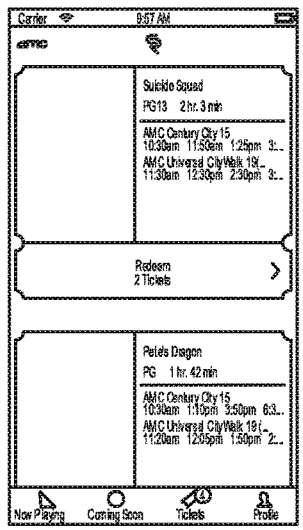

As shown in FIG. 8E, the exhibitor interface provides the user with data identifying scheduled presentations of digital content items. For example, the exhibitor interface provides the user with movie title descriptions, available locations and/or times. The exhibitor interface also enables a user to select to reserve digital credentials to a selected movie.

Figure 8F:
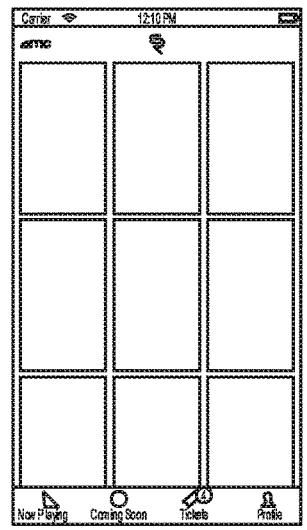

As shown in FIG. 8F, the exhibitor interface presents the user with multiple data tiles that include data and that can be selectable by a user. For example, each data tile can include data associated with a movie, such as images associated with the movie, description text, etc. Further, each data tile can be selectable to enable the user to access additional data.

Figure 8G:
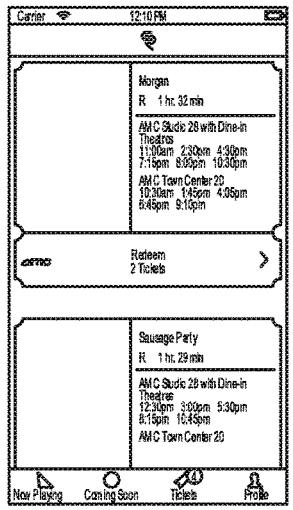

As shown in FIG. 8G, the exhibitor interface provides the user with data identifying scheduled presentations of digital content items. For example, the exhibitor interface provides the user with movie title descriptions, available locations and/or times. The exhibitor interface also enables a user to select to reserve digital credentials to a selected movie.

Figure 8H:
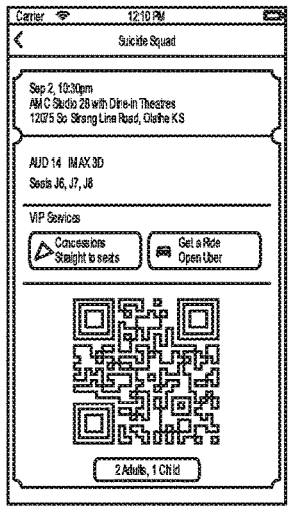

As shown in FIG. 8H, the exhibitor interface presents a visual rendering of a digital credential, such as a QR code. The visual rendering of the digital credential allows a user to redeem the digital credential at an exhibitor location.

Figure 8I:
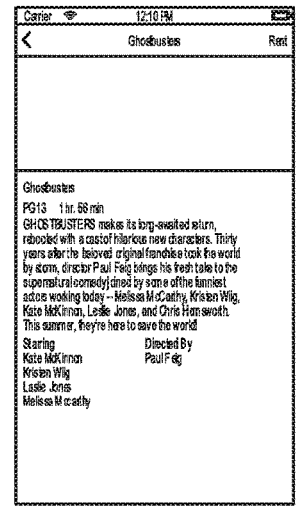

As shown in FIG. 8I, the exhibitor interface provides a user with a detailed written description of a movie. This can include a plot synopsis as well as a listing of key actors/actresses in the movie and the director.

Figure 8J:
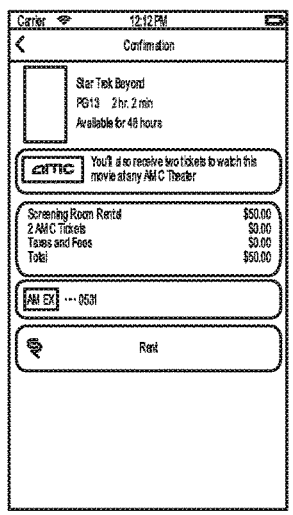

As shown in FIG. 8J the exhibitor interface enables a user to purchase digital credentials and/or a digital content license. As show, the exhibitor interface enables the user to enter payment method data, such as credit card information. The exhibitor interface can also provide the user with the total cost for the requested purchase.

Figure 8K:
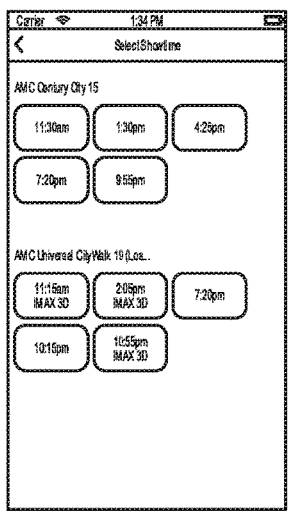

As shown in FIG. 8K, the exhibitor interface presents the user with data tiles representing scheduled presentations of a digital content item. Each data tile includes data describing its respective scheduled presentation, such as the scheduled start time of the scheduled presentation. Further, the data tiles can be interactive such that a user can select a data tile to receive addition information regarding the corresponding scheduled presentation and/or to reserve digital credentials for the scheduled presentation.

Figure 8L:
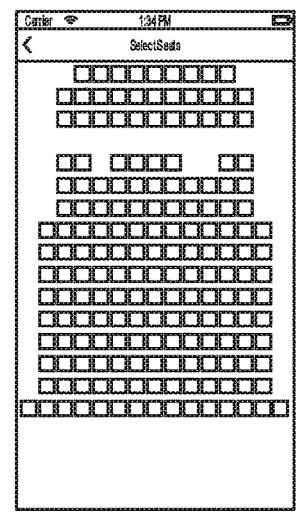

As shown in FIG. 8L, the exhibitor interface presents the user with a seating map identifying the seats at an exhibitor location. The seating map indicates which seats are reserved and which seats remain available. The seating map can be interactive to allow a user to reserve seats.

Software Architecture

Figure 9:
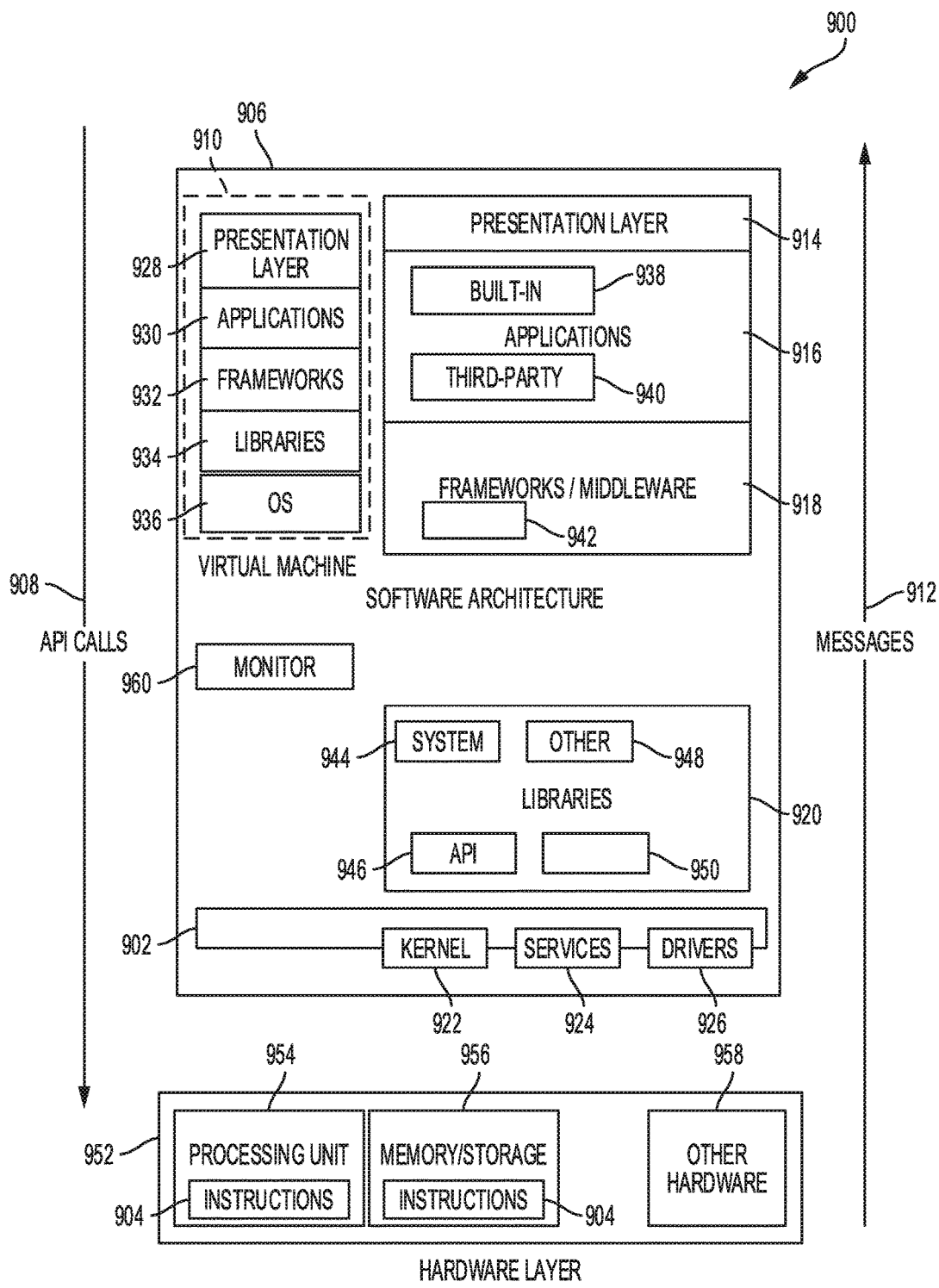
FIG. 9 is a block diagram illustrating a representative software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. Software architecture 906 may execute on hardware such as machine 1000 of FIG. 10 that includes, among other things, processors 1004, memory 1014, and input/output (I/O) components 1018. A representative hardware layer 952 is illustrated and can represent, for example, machine 1000 of FIG. 10. Representative hardware layer 952 includes processing unit 954 having associated executable instructions 904. Executable instructions 904 represent the executable instructions of software architecture 906, including implementation of the methods, modules and so forth described herein. Hardware layer 952 also includes memory and/or storage modules memory/storage 956, which also have executable instructions 904. Hardware layer 952 may also comprise other hardware 958.

In the example architecture of FIG. 9, software architecture 906 may be conceptualized as a stack of layers where each layer provides particular functionality. For example, software architecture 906 may include layers such as operating system 902, libraries 920, applications 916 and a presentation layer 914. Operationally, applications 916 and/or other components within the layers may invoke application programming interface (API) API calls 908 through the software stack and receive a response as in response to API calls 908. The layers illustrated are representative in nature and not all software architectures have all layers. For example, some mobile or special purpose operating systems may not provide frameworks/middleware 918, while others may provide such a layer. Other software architectures may include additional or different layers.

Operating system 902 may manage hardware resources and provide common services. Operating system 902 may include, for example, kernel 922, services 924, and drivers 926. Kernel 922 may act as an abstraction layer between the hardware and the other software layers. For example, kernel 922 may be responsible for memory management, processor management (e.g., scheduling), component management, networking, security settings, and so on. Services 924 may provide other common services for the other software layers. Drivers 926 may be responsible for controlling or interfacing with the underlying hardware. For instance, drivers 926 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

Libraries 920 may provide a common infrastructure that may be used by applications 916 and/or other components and/or layers. Libraries 920 typically provide functionality that allows other software modules to perform tasks in an easier fashion than to interface directly with the underlying operating system 902 functionality (e.g., kernel 922, services 924 and/or drivers 926). Libraries 920 may include system libraries 944 (e.g., C standard library) that may provide functions such as memory allocation functions, string manipulation functions, mathematic functions, and the like. In addition, libraries 920 may include API libraries API 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic movie on a display), database libraries (e.g., SQLite that may provide various relational database functions), web libraries (e.g., WebKit that may provide web browsing functionality), and the like. Libraries 920 may also include a wide variety of other libraries 950 to provide many other APIs to applications 916 and other software components/modules.

The frameworks frameworks/middleware 918 (also sometimes referred to as middleware) provide a higher-level common infrastructure that may be used by applications 916 and/or other software components/modules. For example, frameworks/middleware 918 may provide various graphic user interface (GUI) functions, high-level resource management, high-level location services, and so forth. Frameworks/middleware 918 may provide a broad spectrum of other APIs that may be utilized by applications 916 and/or other software components/modules, some of which may be specific to a particular operating system or platform.

Applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include any application developed using the Android™ or iOS™ software development kit (SDK) by an entity other than the vendor of the particular platform, and may be mobile software running on a mobile operating system such as iOS™, Android™, Windows® Phone, or other mobile operating systems. Third-party applications 940 may invoke the API calls 908 provided by the mobile operating system such as operating system 902 to facilitate functionality described herein.

Applications 916 may use built-in operating system functions (e.g., kernel 922, services 924 and/or drivers 926), libraries 920, frameworks/middleware 918 to create user interfaces to interact with users of the system. Alternatively, or additionally, in some systems interactions with a user may occur through a presentation layer, such as presentation layer 914. In these systems, the application/module "logic" can be separated from the aspects of the application/module that interact with a user.

Some software architectures use virtual machines. In the example of FIG. 9, this is illustrated by virtual machine 910. Virtual machine 910 creates a software environment where applications/modules can execute as if they were executing on a hardware machine (such as the machine 1000 of FIG. 10, for example). Virtual machine 910 is hosted by a host operating system (operating system (OS) 936 in FIG. 9) and typically, although not always, has a virtual machine monitor 960, which manages the operation of virtual machine 910 as well as the interface with the host operating system (i.e., operating system 902). A software architecture executes within the virtual machine 910 such as operating system (OS) 936, libraries 934, frameworks 932, applications 930 and/or presentation layer 928. These layers of software architecture executing within the virtual machine 910 can be the same as corresponding layers previously described or may be different.

Figure 10:
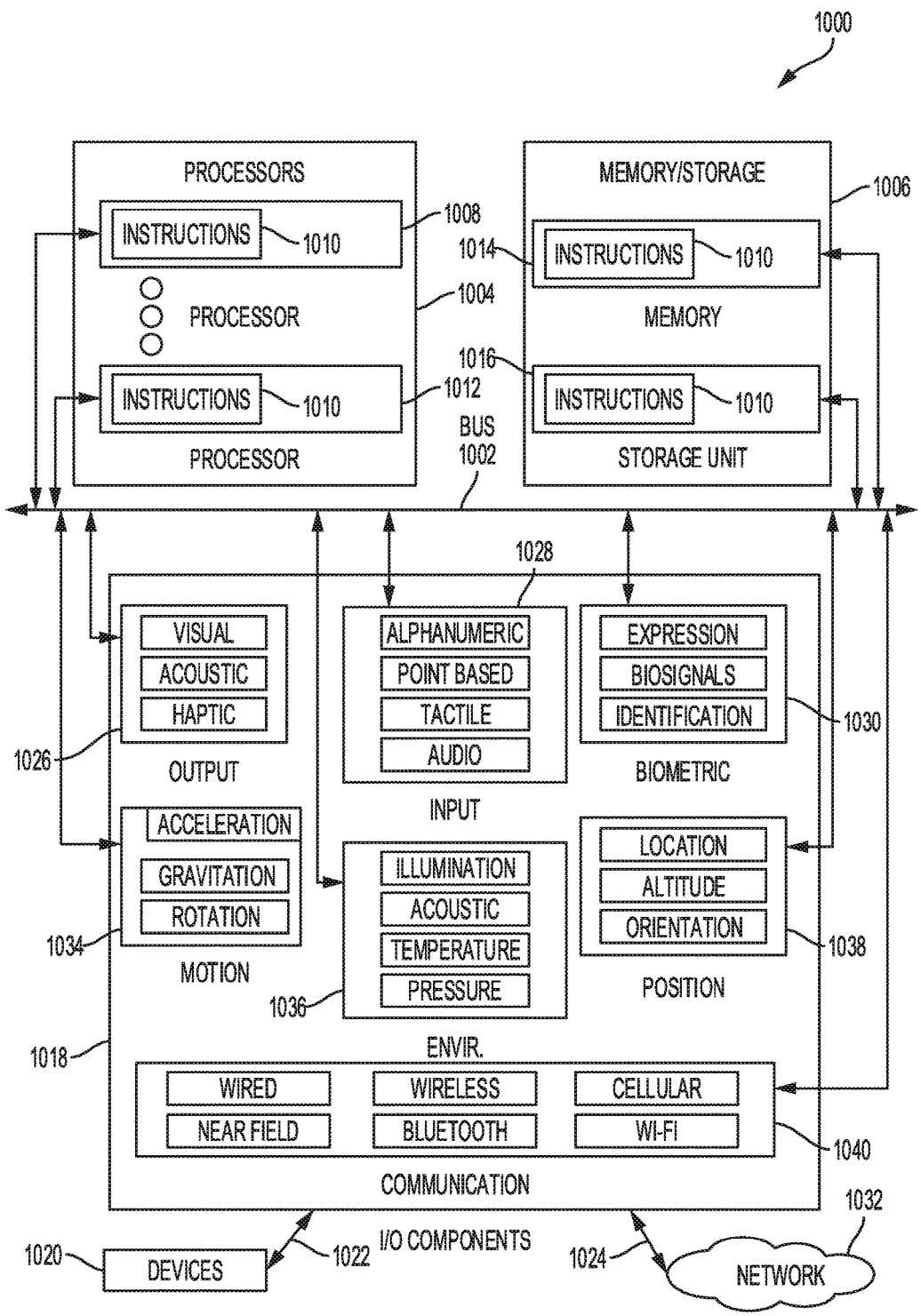
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of machine 1000, according to some example embodiments, able to read instructions from a machine-readable medium (e.g., a machine-readable storage medium) and perform any one or more of the methodologies discussed herein. Specifically, FIG. 10 shows a diagrammatic representation of machine 1000 in the example form of a computer system, within which instructions 1010 (e.g., software, a program, an application, an applet, an app, or other executable code) for causing machine 1000 to perform any one or more of the methodologies discussed herein may be executed. As such, the instructions 1010 may be used to implement modules or components described herein. The instructions 910 transform the general, non-programmed machine into a particular machine programmed to carry out the described and illustrated functions in the manner described. In alternative embodiments, machine 1000 operates as a standalone device or may be coupled (e.g., networked) to other machines. In a networked deployment, machine 1000 may operate in the capacity of a server machine or a client machine in a server-client network environment, or as a peer machine in a peer-to-peer (or distributed) network environment. Machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile computing device, a wearable device (e.g., a smart watch), a smart home device (e.g., a smart appliance), other smart devices, a web appliance, a network router, a network switch, a network bridge, or any machine capable of executing instructions 1010, sequentially or otherwise, that specify actions to be taken by machine 1000. Further, while only a single machine 1000 is illustrated, the term "machine" shall also be taken to include a collection of machines that individually or jointly execute instructions 1010 to perform any one or more of the methodologies discussed herein.

Machine 1000 may include processors 1004, memory memory/storage 1006, and input/output (I/O) components 1018, which may be configured to communicate with each other such as via bus 1002. Memory/storage 1006 may include memory 1014, such as a main memory, or other memory storage, and storage unit 1016, both accessible to processors 1004 such as via bus 1002. Storage unit 1016 and memory 1014 store instructions 1010 embodying any one or more of the methodologies or functions described herein. Instructions 1010 may also reside, completely or partially, within memory 1014, within storage unit 1016, within at least one of processors 1004 (e.g., within the processor's cache memory), or any suitable combination thereof, during execution thereof by the machine 1000. Accordingly, memory 1014, storage unit 1016, and memory of processors 1004 are examples of machine-readable media.

The input/output (I/O) components 1018 may include a wide variety of components to receive input, provide output, produce output, transmit information, exchange information, capture measurements, and so on. The specific input/output (I/O) components 1018 that are included in a particular machine will depend on the type of machine. For example, portable machines such as mobile phones will likely include a touch input device or other such input mechanisms, while a headless server machine will likely not include such a touch input device. It will be appreciated that input/output (I/O) components 1018 may include many other components that are not shown in FIG. 10. Input/output (I/O) components 1018 are grouped according to functionality merely for simplifying the following discussion and the grouping is in no way limiting. In various example embodiments, input/output (I/O) components 1018 may include output components 1026 and input components 1028. Output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. Input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, input/output (I/O) components 1018 may include biometric components 1030, motion components 1034, environmental components 1036, or position components 1038 among a wide array of other components. For example, biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. Motion components 1034 may include acceleration sensor components (e.g., accelerometer), gravitation sensor components, rotation sensor components (e.g., gyroscope), and so forth. Environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. Position components 1038 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. Input/output (I/O) components 1018 may include communication components 1040 operable to couple the machine 1000 to network 1032 or devices 1020 via coupling 1022 and coupling 1024, respectively. For example, communication components 1040 may include a network interface component or other suitable device to interface with network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. Devices 1020 may be another machine or any of a wide variety of peripheral devices (e.g., a peripheral device coupled via a Universal Serial Bus (USB)).

Moreover, communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

What is claimed is:

1. A method comprising:
   receiving, by a digital content delivery system, a request from a client-side digital delivery device to rent a first digital movie;
   in response to receiving the request, assigning, by the digital content delivery system, a digital content license to a user account associated with the client-side digital delivery device, the digital content license permitting a user of the user account to:
     attend a scheduled presentation of the first digital movie at an exhibitor location, and
     stream the first digital movie from the client-side digital content delivery device associated with the user account;
   receiving, from a client device associated with the user account, a substitution request to use the digital content license assigned to the user account to attend a scheduled presentation of another digital movie that is different than the first digital movie;
   in response to receiving the substitution request:
     determining a period of time that has elapsed elapses since a predetermined priority time associated with the first digital movie, the predetermined priority time being based on a release date of the first digital movie;
     comparing the period of time to a threshold period of time, yielding a comparison;
     determining, based on the comparison, that the period of time is less than the threshold period of time, yielding a comparison determination; and
     determining, based on the comparison determination, that the digital content license assigned to the user account is eligible for substitution;
   in response to determining that the digital content license assigned to the user account is eligible for substitution, identifying, based on the digital content license assigned to the user account, a set of alternate digital movies that are accessible by the user;
   providing, to the client device, data identifying the set of alternate digital movies, the client device presenting a visual representation of the set of alternate digital movies on a display of the client device;
   receiving, from the client device, data indicating a selection of a first alternate digital movie from the set of alternate digital movies;
   assigning an updated digital content license to the user account, the updated digital content license permitting the user of the user account to attend a scheduled presentation of the first alternate digital movie in place of the first digital movie.

2. The method of claim 1, further comprising:
   transmitting, to the client device, a set of scheduled presentations of the first alternate digital movie;
   receiving, from the client device, data indicating a selection of a first scheduled presentation of the first alternate digital movie; and
   assigning a digital credential to the user account, the digital credential being redeemable at an exhibitor location to view the first scheduled presentation of the first alternate digital movie.

3. The method of claim 2, further comprising:
   determining a digital content exhibitor associated with a purchase, made by the user, for the digital content license assigned to the user account;
   determining exhibitor locations of the digital content exhibitor that are located within a predetermined geographic distance of a dwelling associated with the user account; and
   identifying the set of scheduled presentations of the first alternate digital content item based on a listing of scheduled presentations of the alternate digital content item provided by at least one exhibitor location located within the predetermined geographic distance of the dwelling associated with the user account.

4. The method of claim 1, wherein identifying the set of alternate digital content items that are accessible by the user comprises:
   determining that an elapsed period of time between a predetermined priority time of at least one alternate digital content item and the current time is greater than the threshold period of time.

5. The method of claim 2, wherein the exhibitor location is a movie theatre.

6. A digital content delivery system comprising:
   one or more computer processors; and
   one or more non-transitory computer-readable mediums storing instructions that, when executed by the one or more computer processors, cause the digital content delivery system to perform operations comprising:
     receiving a request from a client-side digital delivery device to rent a first digital movie;
     in response to receiving the request, assigning a digital content license to a user account associated with the client-side digital delivery device, the digital content license permitting a user of the user account to:
       attend a scheduled presentation of the first digital movie at an exhibitor location, and
       stream the first digital movie from the client-side digital content delivery device associated with the user account;
     receiving, from a client device associated with the user account, a substitution request to use the digital content license assigned to the user account to attend a scheduled presentation of another digital movie that is different than the first digital movie;
     in response to receiving the substitution request:
       determining a period of time that has elapses elapsed since a predetermined priority time associated with the first digital movie, the predetermined priority time being based on a release date of the first digital movie;

comparing the period of time to a threshold period of time, yielding a comparison;

determining, based on the comparison, that the period of time is less than the threshold period of time, yielding a comparison determination; and determining, based on the comparison determination, that the digital content license assigned to the user account is eligible for substitution;

in response to determining that the digital content license assigned to the user account is eligible for substitution, identifying, based on the digital content license assigned to the user account, a set of alternate digital movies that are accessible by the user;

providing, to the client device, data identifying the set of alternate digital movies, the client device presenting a visual representation of the set of alternate digital movies on a display of the client device;

receiving, from the client device, data indicating a selection of a first alternate digital movie from the set of alternate digital movies;

assigning an updated digital content license to the user account, the updated digital content license permitting the user of the user account to attend a scheduled presentation of the first alternate digital movie in place of the first digital movie.

7. The digital content delivery system of claim 6, the operations further comprising:

transmitting, to the client device, a set of scheduled presentations of the first alternate digital movie;

receiving, from the client device, data indicating a selection of a first scheduled presentation of the first alternate digital movie; and assigning a digital credential to the user account, the digital credential being redeemable at an exhibitor location to view the first scheduled presentation of the first alternate digital movie.

8. The digital content delivery system of claim 7, the operations further comprising:

determining a digital content exhibitor associated with a purchase, made by the user, for the digital content license assigned to the user account;

determining exhibitor locations of the digital content exhibitor that are located within a predetermined geographic distance of a dwelling associated with the user account; and identifying the set of scheduled presentations of the first alternate digital content item based on a listing of scheduled presentations of the alternate digital content item provided by at least one exhibitor location located within the predetermined geographic distance of the dwelling associated with the user account.

9. The digital content delivery system of claim 6, wherein identifying the set of alternate digital content items that are accessible by the user comprises:

determining that an elapsed period of time between a predetermined priority time of at least one alternate digital content item and the current time is greater than the threshold period of time.

10. The digital content delivery system of claim 7, wherein the exhibitor location is a movie theatre.

11. A non-transitory computer-readable medium storing instructions that, when executed by one or more computer processors of a digital content delivery system, cause the digital content delivery system to perform operations comprising:

receiving a request from a client-side digital delivery device to rent a first digital movie;

in response to receiving the request, assigning a digital content license to a user account associated with the client-side digital delivery device, the digital content license permitting a user of the user account to:

attend a scheduled presentation of the first digital movie at an exhibitor location, and stream the first digital movie from the client-side digital content delivery device associated with the user account;

receiving, from a client device associated with the user account, a substitution request to use the digital content license assigned to the user account to attend a scheduled presentation of another digital movie that is different than the first digital movie;

in response to receiving the substitution request:

determining a period of time that has elapses elapsed since a predetermined priority time associated with the first digital movie, the predetermined priority time being based on a release date of the first digital movie;

comparing the period of time to a threshold period of time, yielding a comparison;

determining, based on the comparison, that the period of time is less than the threshold period of time, yielding a comparison determination; and determining, based on the comparison determination, that the digital content license assigned to the user account is eligible for substitution;

in response to determining that the digital content license assigned to the user account is eligible for substitution, identifying, based on the digital content license assigned to the user account, a set of alternate digital movies that are accessible by the user;

providing, to the client device, data identifying the set of alternate digital movies, the client device presenting a visual representation of the set of alternate digital movies on a display of the client device;

receiving, from the client device, data indicating a selection of a first alternate digital movie from the set of alternate digital movies;

assigning an updated digital content license to the user account, the updated digital content license permitting the user of the user account to attend a scheduled presentation of the first alternate digital movie in place of the first digital movie.

12. The non-transitory computer-readable medium of claim 11, the operations further comprising:

transmitting, to the client device, a set of scheduled presentations of the first alternate digital movie;

receiving, from the client device, data indicating a selection of a first scheduled presentation of the first alternate digital movie; and assigning a digital credential to the user account, the digital credential being redeemable at an exhibitor location to view the first scheduled presentation of the first alternate digital movie.

13. The non-transitory computer-readable medium of claim 12, the operations further comprising:

determining a digital content exhibitor associated with a purchase, made by the user, for the digital content license assigned to the user account;

determining exhibitor locations of the digital content exhibitor that are located within a predetermined geographic distance of a dwelling associated with the user account; and identifying the set of scheduled presentations of the first alternate digital content item based on a listing of scheduled presentations of the alternate digital content item provided by at least one exhibitor location located within the predetermined geographic distance of the dwelling associated with the user account.

14. The non-transitory computer-readable medium of claim 11, wherein identifying the set of alternate digital content items that are accessible by the user comprises:

determining that an elapsed period of time between a predetermined priority time of at least one alternate digital content item and the current time is greater than the threshold period of time.

15. The non-transitory computer-readable medium of claim 12, wherein the exhibitor location is a movie theatre.

* * * * *